(12) United States Patent
Xu et al.

(10) Patent No.: US 11,975,359 B2
(45) Date of Patent: May 7, 2024

(54) HAPTIC STIMULATION SYSTEMS AND METHODS

(71) Applicant: Huawei Technologies Co., Ltd., Shenzhen (CN)

(72) Inventors: Jun Xu, Plano, TX (US); Fei Liu, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 17/511,281

(22) Filed: Oct. 26, 2021

(65) Prior Publication Data

US 2022/0048070 A1 Feb. 17, 2022

Related U.S. Application Data

(63) Continuation of application No. PCT/US2019/030004, filed on Apr. 30, 2019.

(51) Int. Cl.
*B06B 1/02* (2006.01)
*H04R 1/00* (2006.01)

(52) U.S. Cl.
CPC .............. *B06B 1/0284* (2013.01); *H04R 1/00* (2013.01)

(58) Field of Classification Search
CPC ......... B06B 1/0284; H04R 1/00; G06F 3/016; A61H 23/0236; A61H 23/0245
See application file for complete search history.

(56) References Cited

U.S. PATENT DOCUMENTS

| | | | |
|---|---|---|---|
| 4,969,867 | A | 11/1990 | Cohen |
| 6,193,677 | B1 | 2/2001 | Cady |
| 2003/0025595 | A1 | 2/2003 | Langberg |
| 2006/0015045 | A1 | 1/2006 | Zets et al. |
| 2006/0149169 | A1 | 7/2006 | Nunomura et al. |
| 2008/0143496 | A1 | 1/2008 | Linjama |
| 2014/0139328 | A1 | 5/2014 | Zellers et al. |
| 2015/0253850 | A1 | 9/2015 | Behles |
| 2018/0040258 | A1 | 2/2018 | Kouache |
| 2018/0280227 | A1 | 10/2018 | Quest et al. |
| 2019/0043322 | A1 | 2/2019 | Tachi et al. |
| 2019/0101987 | A1 | 4/2019 | Yokoyama et al. |

(Continued)

FOREIGN PATENT DOCUMENTS

| | | |
|---|---|---|
| CN | 1200860 A | 12/1998 |
| CN | 1787852 A | 6/2006 |

(Continued)

OTHER PUBLICATIONS

Translation of KR-20080055571-A (Year: 2008).*

(Continued)

*Primary Examiner* — Daniel Pihulic
(74) *Attorney, Agent, or Firm* — Conley Rose, P.C.

(57) ABSTRACT

The disclosure relates to technology for haptic stimulation. A haptic stimulation device comprises a set of haptic stimulation elements. Each haptic stimulation element comprises a transducer configured to generate a pressure wave and an enclosure coupled to the transducer thereby forming a cavity bounded by the enclosure and the transducer. The haptic stimulation device comprises a controller configured to drive the transducers to generate a haptic stimulation pattern based on pressure waves in the cavities.

19 Claims, 15 Drawing Sheets

(56) References Cited

U.S. PATENT DOCUMENTS

2020/0293111 A1    9/2020  Gwak
2022/0048070 A1*   2/2022  Xu ................... A61H 23/0245

FOREIGN PATENT DOCUMENTS

| CN | 101227764 | A |   | 7/2008 |   |
|---|---|---|---|---|---|
| CN | 104685444 | A |   | 6/2015 |   |
| CN | 105873498 | A |   | 8/2016 |   |
| CN | 107920949 | A |   | 4/2018 |   |
| CN | 108780359 | A |   | 11/2018 |   |
| CN | 108885489 | A |   | 11/2018 |   |
| DE | 102011086231 | A1 |   | 5/2013 |   |
| KR | 20080055571 | A | * | 6/2008 |   |
| WO | 2013068569 | A2 |   | 5/2013 |   |
| WO | 2017175868 | A1 |   | 10/2017 |   |
| WO | WO-2020222821 | A1 | * | 11/2020 | ......... A61H 23/0236 |

OTHER PUBLICATIONS

"IEEE Standard for Low-Rate Wireless Networks ," IEEE Computer Society, IEEE Std. 802.15, 2015, 708 pages.
"Part 11: Wireless LAN Medium Access Control (MAC) and Physical Layer (PHY) Specifications", IEEE Standard for Information technology—Telecommunications and information exchange between systems—Local and metropolitan area networks—Specific requirements, IEEE Computer Society, IEEE Std. 802.11, 2007, Jun. 12, 2007, 1232 pages.

* cited by examiner

HAPTIC STIMULATION SYSTEMS AND METHODS

CROSS-REFERENCE TO RELATED APPLICATIONS

This application is a continuation of International Application No. PCT/US2019/030004 filed on Apr. 30, 2019 by Futurewei Technologies Inc., and titled "Haptic Stimulation Systems and Methods," which is hereby incorporated by reference.

TECHNICAL FIELD

The disclosure generally relates to haptic stimulation technology.

BACKGROUND

One type of haptic stimulation, which may be referred to as a tactile stimulation, stimulates receptors in human skin. Human skin has a number of different types of receptors, which are adapted for different tactile sensations. Meissner corpuscles in the skin are adapted to sense low frequency vibrations. Merkel cells in the skin are adapted to sense pressure. Ruffini endings in the skin are adapted to sense shear deformation. Pacinian corpuscles in the skin are adapted to sense high frequency vibrations.

SUMMARY

According to one aspect of the present disclosure, there is provided a haptic stimulation device comprising a set of haptic stimulation elements. Each haptic stimulation element comprises a transducer configured to generate a pressure wave and an enclosure coupled to the transducer thereby forming a cavity bounded by the enclosure and the transducer. The haptic stimulation device further comprises a controller configured to drive the transducers to generate a haptic stimulation pattern based on pressure waves in the cavities. The haptic stimulation device does not require motors to generate the haptic stimulation pattern, thereby making for a simpler design. Using transducers configured to generate pressure waves is energy efficient. The haptic stimulation pattern is very accurate.

Optionally, in any of the preceding aspects, the enclosure of each haptic stimulation element comprises a pressure wave hole. The controller is configured to drive the transducers to cause the pressure waves in the cavities to emanate from the pressure wave holes to generate the haptic stimulation pattern.

Optionally, in any of the preceding aspects, the haptic stimulation device further comprises a stimulation membrane positioned over the pressure wave hole of each haptic stimulation element. The stimulation membranes are configured to be vibrated by the pressure waves to generate the haptic stimulation pattern.

Optionally, in any of the preceding aspects, the enclosure of each haptic stimulation element comprises a stimulation region. The stimulation regions are configured to be vibrated by the pressure waves in the cavities to generate the haptic stimulation pattern.

Optionally, in any of the preceding aspects, the controller is configured to drive the transducers at different frequencies in order to convey information in the haptic stimulation pattern. Therefore, different frequencies can be used to convey different state information.

Optionally, in any of the preceding aspects, the controller is configured to drive the transducers at different amplitudes in order to convey information in the haptic stimulation pattern. Therefore, different amplitudes can be used to convey different state information.

Optionally, in any of the preceding aspects, the controller is configured to drive the transducers in one of an on state and an off state in order to convey information in the haptic stimulation pattern.

Optionally, in any of the preceding aspects, the controller is configured to drive the transducers to generate an inaudible acoustic wave. Therefore, the user is not distracted.

Optionally, in any of the preceding aspects, the controller is configured to drive the transducers to generate an inaudible acoustic wave having a frequency between 10 Hertz (Hz) to 10 kilo Hz (kHz).

Optionally, in any of the preceding aspects, the controller is configured to drive the transducers to generate a pressure wave having a sound pressure level of less than 40 decibel (dB) at a distance of one meter from the set of haptic stimulation elements. This low decibel level does not distract the user.

Optionally, in any of the preceding aspects, the transducers comprise micro audio speakers. Micro audio speakers are power efficient. If the haptic stimulation device is powered by a battery, battery power is saved. Also, the small size of micro audio speakers provides for an accurate haptic stimulation pattern.

Optionally, in any of the preceding aspects, the haptic stimulation elements are between 0.5 millimeter (mm) to 2 mm in cross sectional diameter.

Optionally, in any of the preceding aspects, the enclosure of each haptic stimulation element comprises a cavity resonator. The cavity resonator could be used to enhance desirable frequencies.

According to one other aspect of the present disclosure, there is provided method for providing a haptic stimulation interface. The method comprises selecting haptic stimulation elements to activate in order to provide a haptic stimulation pattern. Each haptic stimulation element comprises a transducer and an enclosure coupled to the transducer thereby forming a cavity bounded by the enclosure and the transducer. The method also comprises driving the transducers of the selected haptic stimulation elements to generate pressure waves in the cavities in order to generate the haptic stimulation pattern based on the pressure waves.

According to still one other aspect of the present disclosure, there is provided a haptic stimulation device. The haptic stimulation device includes a haptic stimulation interface comprising a pattern of haptic stimulation elements configured to stimulate receptors in skin of a user. Each of the haptic stimulation elements comprises a cavity resonator and an electro-vibration transducer configured to generate a pressure wave into the cavity resonator. The haptic stimulation device includes a receiver configured to receive information to present in the haptic stimulation interface. The haptic stimulation device includes a controller configured to drive the electro-vibration transducers based on the received information to generate a haptic stimulation pattern in the receptors in the user's skin based on the pressure waves in the cavity resonators.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
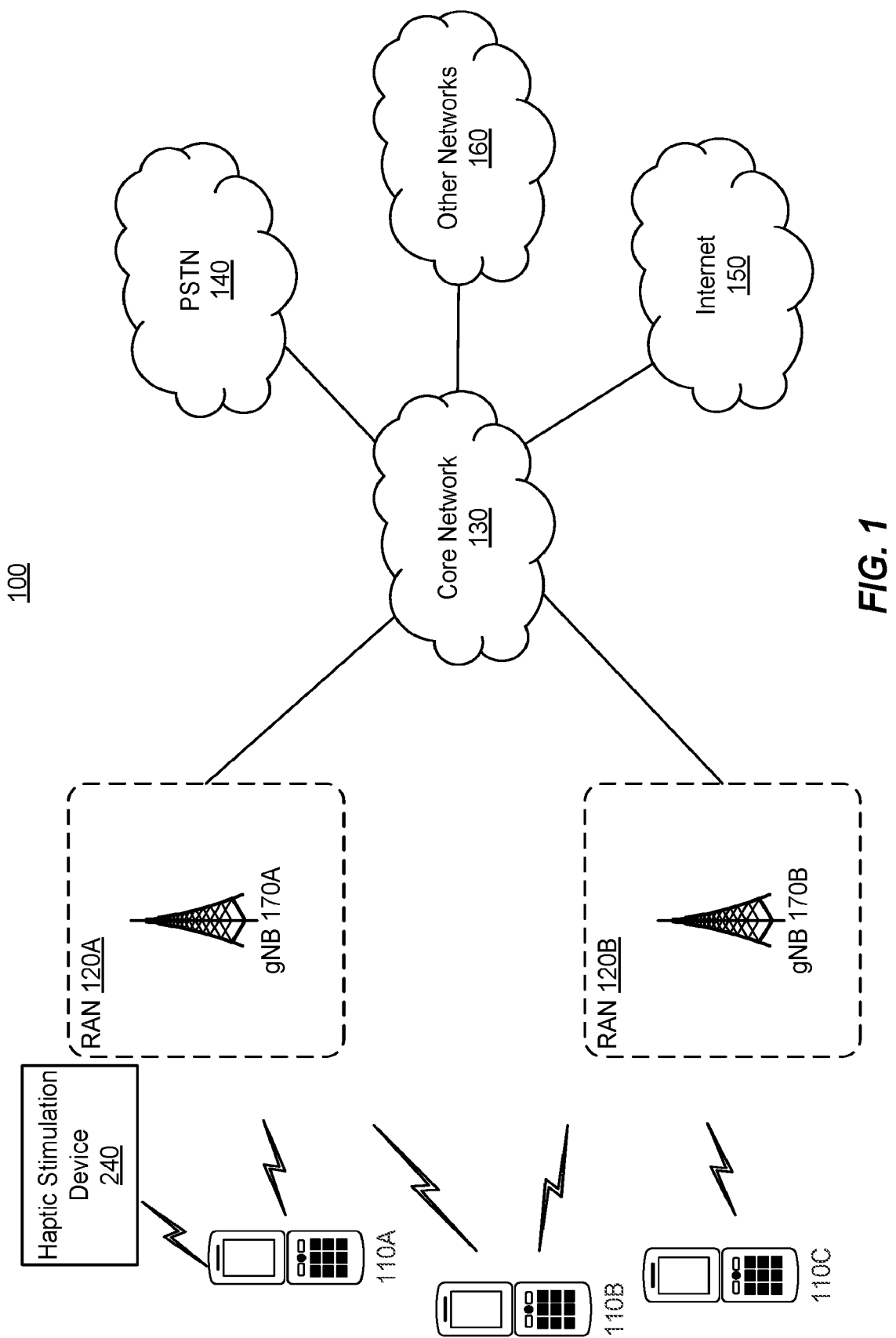
FIG. 1 illustrates a wireless network for communicating data.

The present disclosure will now be described with reference to the figures, which in general relate to haptic stimulation systems and methods. A haptic stimulation interface has a set of haptic stimulation elements, in some embodiments. Each haptic stimulation element has a transducer configured to generate a pressure wave. The transducer may be an electro-vibration transducer. Each haptic stimulation element also has an enclosure coupled to the transducer thereby forming a cavity bounded by the enclosure and the transducer, in some embodiments. Rather than using the transducers to directly stimulate receptors in a user's skin, the pressure waves are used to either directly or indirectly stimulate receptors in the user's skin, in some embodiments. Therefore, the transducer will not be damaged by direct contact with the user.

The transducers are quite small in some embodiments. For example, a transducer might be between about 0.5 millimeter (mm) to 2 mm in diameter, in some embodiments. The haptic stimulation interface may contain an array of haptic stimulation elements, each containing a transducer. The array may be, for example, 5 mm×5 mm or 10 mm×10 mm. The haptic stimulation pattern provided by the haptic stimulation interface is very accurate. By providing a solution in which the user need not directly touch the transducers, small and possibly delicate transducers may be used to provide a haptic stimulation interface. Also, the haptic stimulation device does not require motors to drive the transducers, thereby making for a simpler and smaller design. Furthermore, using transducers configured to generate pressure waves is energy efficient. Thus, if the haptic stimulation system is battery powered, battery life is extended.

In one embodiment, the enclosure of a haptic stimulation element has a pressure wave hole that is configured to allow the pressure wave to emanate from the enclosure. The transducers in the set of haptic stimulation elements are driven to generate a haptic stimulation pattern based on pressure waves that emanate from the pressure wave holes of the enclosures of the haptic stimulation elements, in one embodiment. The haptic stimulation pattern refers to the pattern in the haptic stimulation interface. When a user touches the haptic stimulation interface receptors in the user's skin are stimulated. In one embodiment, the enclosure has a stimulation membrane positioned over the pressure wave hole. The stimulation membranes are vibrated by the pressure waves from the pressure wave holes to generate the haptic stimulation pattern, in one embodiment. In one embodiment, the enclosure comprises a stimulation region configured to be vibrated by the pressure wave in the cavity to generate the haptic stimulation pattern.

In some embodiments, the transducers are driver either "on" or "off" in order to convey information in the haptic stimulation pattern. The transducers are driven to generate an inaudible acoustic wave at a distance of one meter from the haptic stimulation interface, in some embodiments. Herein, the definition of an inaudible acoustic wave is with reference to the pressure wave at a distance of one meter from the haptic stimulation interface. The sound pressure (also referred to as the acoustic pressure) is the local pressure deviation from the ambient (average or equilibrium) atmospheric pressure, caused by a sound wave. The sound pressure may be measured in Pascals. The sound pressure level (SPL) is measured in decibels (dB) in accordance with Equation 1.

$$SPL = 20 \log p/p_0 \qquad \text{Equation 1}$$

In Equation 1, SPL refers to the sound pressure level. The pressure "p" refers to the pressure (in Pascals) of the sound wave being measured. The pressure "$p_0$" refers to the pressure of a reference sound wave. The reference sound wave has a pressure of 0.00002 Pascals.

Herein, a sound wave having a sound pressure level below 40 dB (at a distance of one meter from the haptic stimulation interface) is defined as being inaudible to a human ear. Herein, any sound wave having a frequency below 20 Hz or above 20 kHz is defined as being inaudible to a human ear. Stated another way, 20 Hz to 20 kHz is defined herein as an audible frequency range (noting that the sound wave has sufficient SPL to be audible as defined herein). Thus, if the frequency is below 20 Hz, then the SPL of the sound wave at a distance of one meter from the haptic stimulation interface may be greater than 40 dB and still be inaudible.

In some embodiments, the transducers are driven individually at different frequencies in order to convey information in the haptic stimulation pattern. In some embodiments, different frequencies can be assigned to different states. For example, ten different states may be assigned a corresponding ten different frequencies. Each transducer is driven at a frequency that corresponds to one of the states in order to convey information to the user, in some embodiments.

In some embodiments, the transducers are driven individually at different amplitudes in order to convey information in the haptic stimulation pattern. In some embodiments, different amplitudes can be assigned to different states. For example, ten different states may be assigned a corresponding ten different amplitudes. Each transducer is driven at an amplitude that corresponds to one of the states in order to convey information to the user, in some embodiments.

In some embodiments, the enclosures of the haptic stimulation elements comprise cavity resonators. In one embodiment, the cavity resonators are configured to increase acoustic energy at one or more resonant frequencies of the cavity resonators in order to emphasize inaudible frequencies. In one embodiment, the cavity resonators are configured to decrease acoustic energy at one or more resonant frequencies of the cavity resonators in order to de-emphasize audible frequencies.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates a wireless network for communicating data. The communication system 100 includes, for example, user equipment 110A, 110B, and 110C, radio access networks (RANs) 120A and 120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g., 100 or 200 microseconds), to communicate with the communication devices. In general, a base station may also be used to refer any of the evolved node B (eNB) and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A, 110B, and 110C, which can be referred to individually as a UE 110, or collectively as the UEs 110, are configured to operate and/or communicate in the system 100. For example, a UE 110 can be configured to transmit and/or receive wireless signals or wired signals. Each UE 110 represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A, 120B include one or more base stations (BSs) 170A, 170B, respectively. The RANs 120A and 120B can be referred to individually as a RAN 120, or collectively as the RANs 120. Similarly, the base stations (BSs) 170A and 170B can be referred individually as a base station (BS) 170, or collectively as the base stations (BSs) 170. Each of the BSs 170 is configured to wirelessly interface with one or more of the UEs 110 to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the BS 170A forms part of the RAN 120A, which may include one or more other BSs 170, elements, and/or devices. Similarly, the BS 170B forms part of the RAN 120B, which may include one or more other BSs 170, elements, and/or devices. Each of the BSs 170 operates to transmit and/or receive wireless signals within a particular geographic region or area, sometimes referred to as a "cell." In some embodiments, multiple-input multiple-output (MIMO) technology may be employed having multiple transceivers for each cell.

The BSs 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the BSs 170 and UEs 110 are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement Universal Mobile Telecommunications System (UMTS), High Speed Packet Access (HSPA), or evolved HSPA (HSPA+) standards and protocols. Of course, other multiple access schemes and wireless protocols may be utilized.

The RANs 120 are in communication with the core network 130 to provide the UEs 110 with voice, data, application, Voice over Internet Protocol (VoIP), or other services. As appreciated, the RANs 120 and/or the core network 130 may be in direct or indirect communication with one or more other RANs (not shown). The core network 130 may also serve as a gateway access for other networks (such as PSTN 140, Internet 150, and other networks 160).

In addition, some or all of the UEs 110 may include functionality for communicating with different wireless networks over different wireless links using different wireless technologies and/or protocols.

The RANs 120 may also include millimeter and/or microwave access points (APs). The APs may be part of the BSs 170 or may be located remote from the BSs 170. The APs may include, but are not limited to, a connection point (an mmW CP) or a BS 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and universal serial bus (USB) dongles.

In one embodiment, a UE 110 has a wireless connection to a haptic stimulation device 240. The UE 110 sends information (e.g., digital data) to the haptic stimulation device 240 over the wireless connection, in one embodiment. The information is presented in haptic stimulation interface 250. In one embodiment, a haptic stimulation system comprises the haptic stimulation device 240 but does not include the UE 110.

Figure 2:
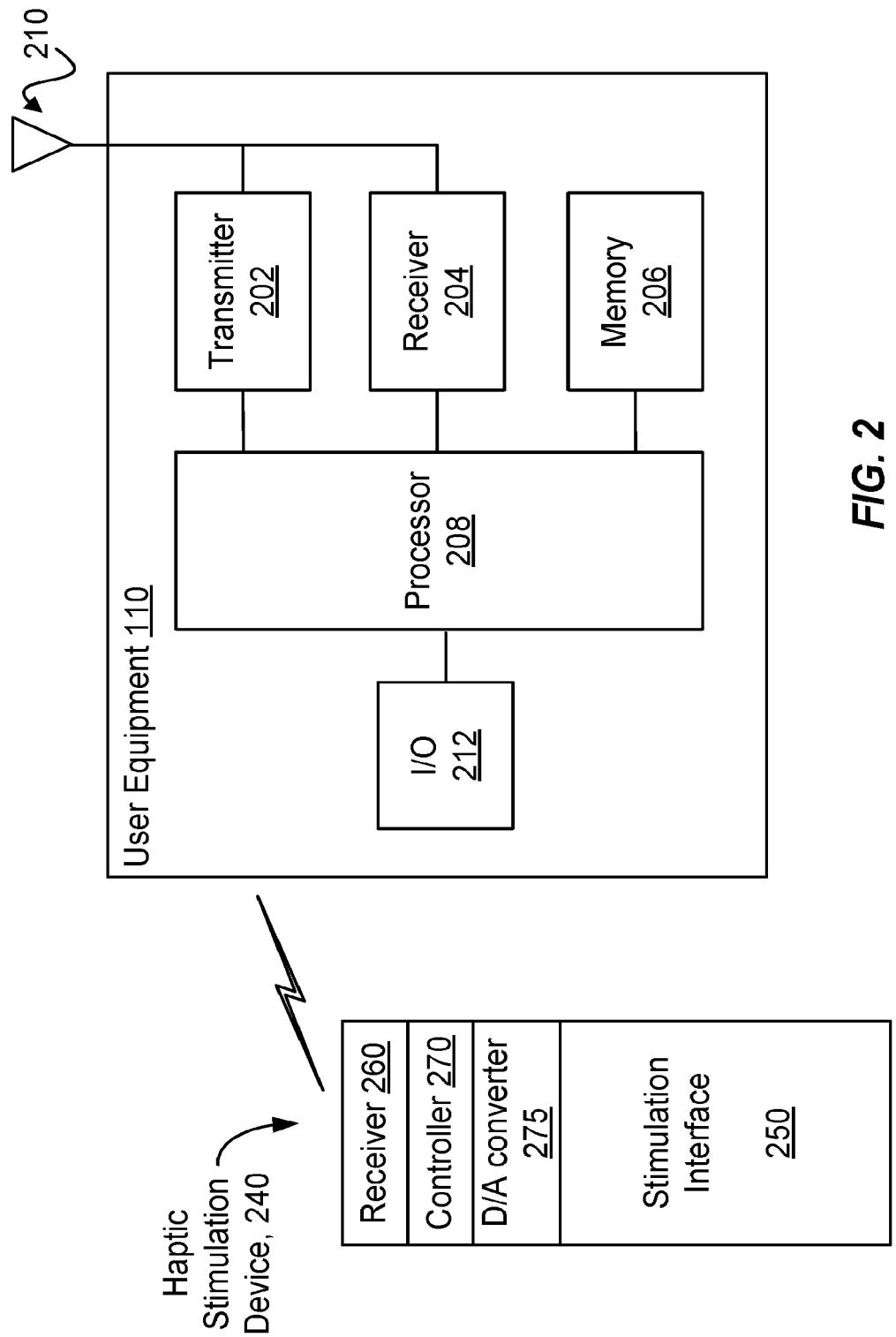
FIG. 2 illustrates one embodiment of a haptic stimulation system.

FIG. 2 illustrates one embodiment of a haptic stimulation system. The haptic stimulation system comprises a haptic stimulation device 240 and the UE 110, in this embodiment. The haptic stimulation system comprises the haptic stimulation device 240 but does not include the UE 110, in another embodiment. The UE 110 may for example be a mobile telephone, but may be other devices in further examples such as a desktop computer, laptop computer, tablet, handheld computing device, automobile computing device and/or other computing devices. As shown in the figure, the exemplary UE 110 is shown as including at least one transmitter 202, at least one receiver 204, memory 206, at least one processor 208, and at least one input/output device 212. The processor 208 can implement various processing operations of the UE 110. For example, the processor 208 can perform signal coding, data processing, power control, input/output processing, or any other functionality enabling the UE 110 to operate in the system 100 (FIG. 1). The processor 208 may include any suitable processing or computing device configured to perform one or more operations. For example, the processor 208 may include a microprocessor, microcontroller, digital signal processor, field programmable gate array, or application specific integrated circuit. The memory 206 is non-transitory memory storage, in one embodiment. The memory 206 is a non-transitory computer readable medium, in one embodiment.

The transmitter 202 can be configured to modulate data or other content for transmission by at least one antenna 210. The transmitter 202 can also be configured to amplify, filter and frequency convert RF signals before such signals are provided to the antenna 210 for transmission. The transmitter 202 can include any suitable structure for generating signals for wireless transmission.

The receiver 204 can be configured to demodulate data or other content received by the at least one antenna 210. The receiver 204 can also be configured to amplify, filter and frequency convert RF signals received via the antenna 210. The receiver 204 is an RF signal receiver, in some embodiments. The receiver 204 can include any suitable structure for processing signals received wirelessly. The antenna 210 can include any suitable structure for transmitting and/or receiving wireless signals. The same antenna 210 can be used for both transmitting and receiving RF signals, or alternatively, different antennas 210 can be used for transmitting signals and receiving signals.

It is appreciated that one or multiple transmitters 202 could be used in the UE 110, one or multiple receivers 204 could be used in the UE 110, and one or multiple antennas 210 could be used in the UE 110. Although shown as separate blocks or components, at least one transmitter 202 and at least one receiver 204 could be combined into a transceiver. Accordingly, rather than showing a separate block for the transmitter 202 and a separate block for the receiver 204 in FIG. 2, a single block for a transceiver could have been shown. At least one of the transmitters 202 is configured to communication with the haptic stimulation device 240, in one embodiment. At least one of the receivers 204 is configured to communication with the haptic stimulation device 240, in one embodiment. Such a transmitter and/or receiver comprises a wireless communication interface configured to communicate with the haptic stimulation device 240, in one embodiment.

The UE 110 further includes one or more input/output devices 212. The input/output devices 212 facilitate interaction with a user. Each input/output device 212 includes any suitable structure for providing information to or receiving information from a user, such as a speaker, microphone, keypad, keyboard, display, or touch screen. Note that some users may have a difficult time using one or more of the structures for receiving information. For example, some users may have a difficult time seeing or reading a visual display on the UE 110. As another example, some users may have a difficult time hearing a speaker on the UE 110. Embodiments of a haptic stimulation device 240 allow a user to obtain such information from the UE 110.

In addition, the UE 110 includes at least one memory 206. The memory 206 stores instructions and data used, generated, or collected by the UE 110. For example, the memory 206 could store software or firmware instructions executed by the processor(s) 208 and data used to reduce or eliminate interference in incoming signals. Each memory 206 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

The UE 110 has a wireless connection to the haptic stimulation device 240. The haptic stimulation device 240 has a haptic stimulation interface 250 (also referred to more briefly as a "stimulation interface"), a receiver 260, a controller 270, and a digital-to-analog (D/A) converter 275. The receiver 260 may comprise a wireless receiver configured to communicate wirelessly with the UE 110. The receiver 260 may be configured to communicate using a variety of wireless communication protocols including, but not limited to, an IEEE (Institute of Electrical and Electronics Engineers) 802.11 protocol or an IEEE 802.15 protocol. In one embodiment, the receiver 260 is configured to communicate using Bluetooth®. Optionally, the haptic stimulation device 240 may have a transmitter, which may be configured to communicate using a variety of wireless communication protocols. In one embodiment, the user is allowed to select what information gets transferred from the UE 110 to the haptic stimulation device 240. As the user becomes more comfortable with the haptic stimulation device 240 the user might request that more detailed information be sent. For example, the user might select to have a notification that an email has been received, key words from the email, the entire email, etc.

The stimulation interface 250 is configured to generate a haptic stimulation pattern. When a user's skin is in contact with the stimulation interface 250, the haptic stimulation pattern stimulates receptors in the user's skin, in one embodiment. The receptors may include, but are not limited to, Meissner corpuscles, Merkel cells, Ruffini endings, and Pacinian corpuscles. The stimulation interface 250 is not required to stimulate all of these types of receptors. In one embodiment, the stimulation interface 250 stimulates a subset of one or more types of receptors (e.g., Meissner corpuscles, Merkel cells, Ruffini endings, and/or Pacinian corpuscles). The stimulation interface 250 has a set (e.g., pattern, array, etc.) of stimulation elements, in one embodiment. The stimulation interface 250 uses mechanical motion (e.g., mechanical vibration) in order to stimulate receptors in human skin, in some embodiments. The stimulation elements each comprise an electro-vibration transducer configured to generate a pressure wave, in one embodiment.

The controller 270 is configured to control operations of the haptic stimulation device 240. The controller 270 is configured to control transfer of data from the UE 110 by way of the receiver 260, in one embodiment. Data transfer is unidirectional, from the UE 110 to the haptic stimulation device 240, in one embodiment. Data transfer is bi-directional, in one embodiment. Therefore, the haptic stimulation device 240 may report configuration information, status, etc. to the UE 110.

The controller 270 is configured to control the presentation of the data in the stimulation interface 250, in one embodiment. The D/A converter 275 is configured to convert a digital signal to an analog signal. In one embodiment, the controller 270 processes a first digital signal from the UE 110 and provides a second digital signal to the D/A converter 275. Based on the second digital signal from the controller 270, the D/A converter 275 outputs an analog signal to drive the stimulation interface 250. The first and second digital signals may be different as the controller 270 may handle functions such as generating a suitable digital signal for the configuration of the stimulation interface 250. In one embodiment, the UE 110 handles these functions, wherein the first and second digital signals may be the same.

The controller 270 may be implemented in hardware, software, or a combination of hardware and software. Hardware control circuit components for implementing the controller 270 may include, but are not limited to, Field-programmable Gate Arrays (FPGAs), Application-specific Integrated Circuits (ASICs), Application-specific Standard Products (ASSPs), System-on-a-chip systems (SOCs), Complex Programmable Control Circuit Devices (CPLDs), special purpose computers, etc. In one embodiment, the controller 270 is implemented with software (stored on a storage device) used to program one or more processors. Thus, the controller 270 may comprise a storage device and a processor.

The controller 270 is configured to drive the transducers to generate a haptic stimulation pattern based on pressure waves that is used to stimulate receptors in a user's skin, in one embodiment. The pressure waves are used to directly stimulate the receptors in the user's skin, in one embodiment. By the pressure waves directly stimulating the receptors in the user's skin it is meant that the pressure wave may directly stimulate the receptors in the user's skin, in one embodiment. Thus, the user need not touch a tangible object to have the receptors stimulated. The pressure waves are used to indirectly stimulate the receptors in the user's skin by causing mechanical vibration in a stimulation membrane, in one embodiment. Using the pressure waves to indirectly stimulate the receptors in the user's skin means to use the pressure waves to create a vibration in a tangible object which the user touches with their skin. For example, the controller 270 drives transducers in a set of stimulation elements such as the stimulation element 410 depicted in FIG. 8A. The pressure waves are used to indirectly stimulate the user's skin by causing mechanical vibration in an enclosure coupled to an electro-vibration transducer, in one embodiment. For example, the controller 270 drives transducers in a set of stimulation elements such as the stimulation element 410 depicted in FIG. 9.

The controller 270 works together with the UE 110 to present information in the stimulation interface 250, in one embodiment. For example, by executing instructions stored in the memory 206 on the processor 208, the UE 110 may send digital data to the receiver 260. Thus, in one embodiment, the combination of the controller 270, processor 208, and memory 206 may be referred to as a control circuit configured to present information in the haptic stimulation interface 250.

Figure 3:
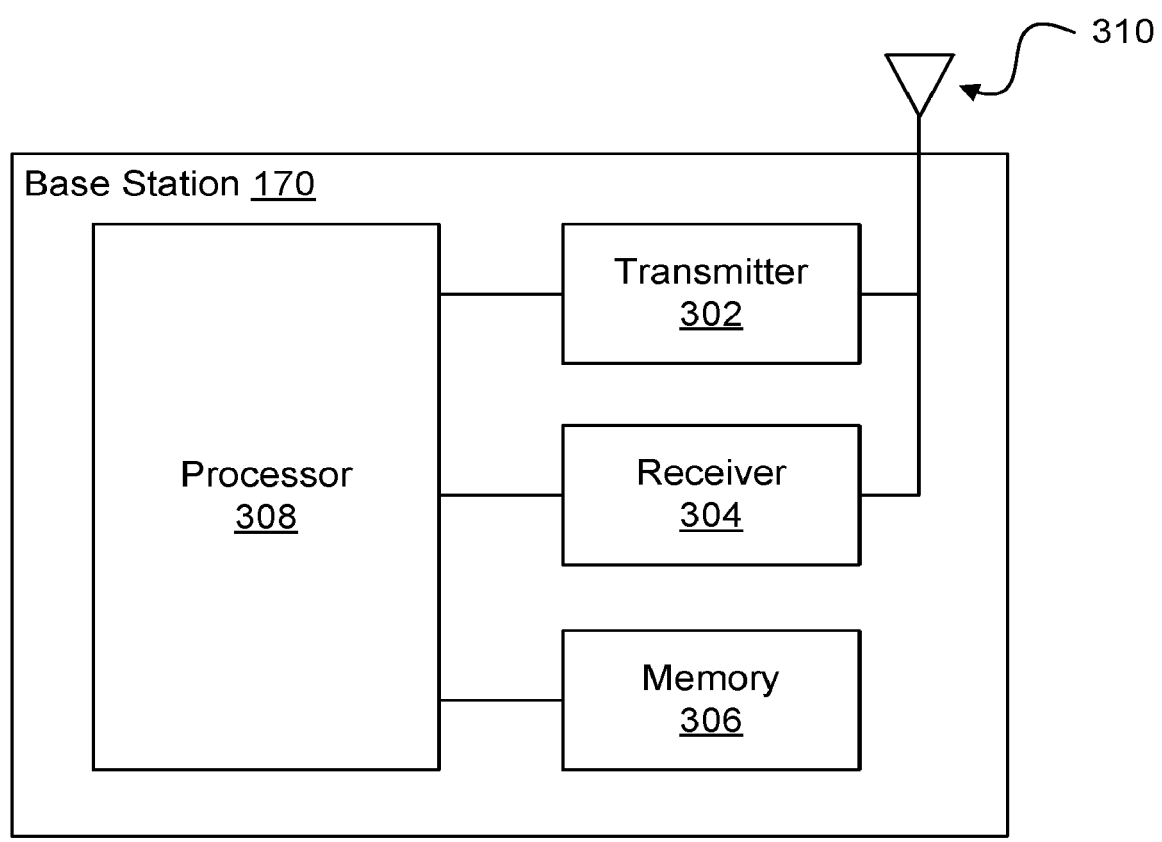
FIG. 3 illustrates an example Base Station.

FIG. 3 illustrates an example BS 170 that may implement the methods and teachings according to this disclosure. As shown in the figure, the BS 170 includes at least one processor 308, at least one transmitter 302, at least one receiver 304, one or more antennas 310, and at least one memory 306. The processor 308 implements various processing operations of the BS 170, such as signal coding, data processing, power control, input/output processing, or any other functionality. Each processor 308 includes any suitable processing or computing device configured to perform one or more operations. Each processor 308 could, for example, include a microprocessor, microcontroller, digital signal processor, field programmable gate array, or application specific integrated circuit. The memory 306 is non-transitory memory storage, in one embodiment.

Each transmitter 302 includes any suitable structure for generating signals for wireless transmission to one or more UEs 110 or other devices. Each receiver 304 includes any suitable structure for processing signals received wirelessly from one or more UEs 110 or other devices. Although shown as separate blocks or components, at least one transmitter 302 and at least one receiver 304 could be combined into a transceiver. Each antenna 310 includes any suitable structure for transmitting and/or receiving wireless signals. While a common antenna 310 is shown here as being coupled to both the transmitter 302 and the receiver 304, one or more antennas 310 could be coupled to the transmitter(s) 302, and one or more separate antennas 310 could be coupled to the receiver(s) 304. Each memory 306 includes any suitable volatile and/or non-volatile storage and retrieval device(s).

Figure 4:
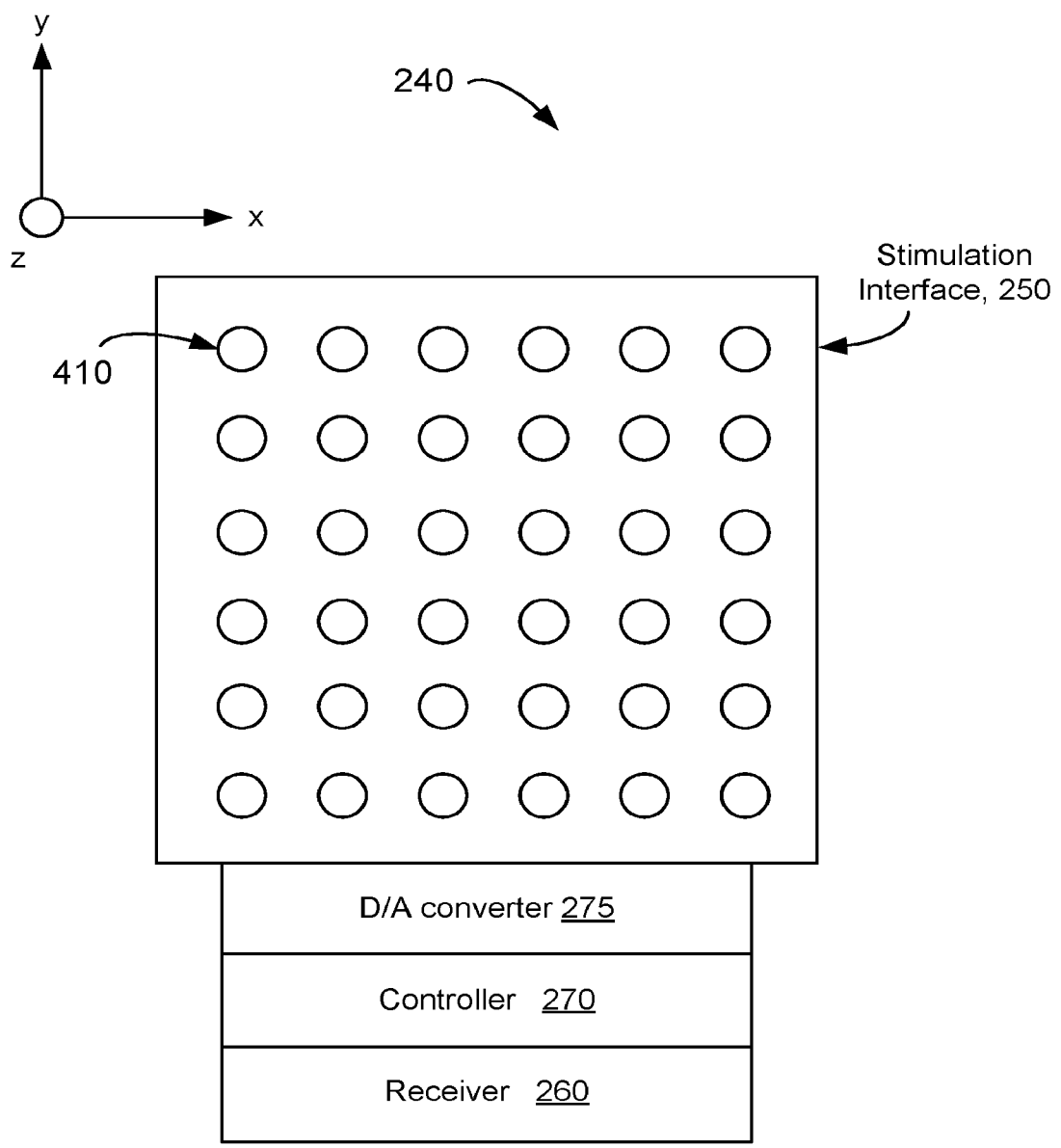
FIG. 4 depicts one embodiment of a haptic stimulation device.

FIG. 4 depicts one embodiment of a haptic stimulation device 240. The stimulation interface 250 has a set (e.g., pattern, array, etc.) of haptic stimulation elements 410 (also referred to more briefly as "stimulation elements"). The set of stimulation elements 410 are used to stimulate receptors (e.g., Meissner corpuscles, Merkel cells, Ruffini endings, and/or Pacinian corpuscles) in human skin, in one embodiment. Each stimulation element 410 may be independently controlled, in one embodiment. The set in FIG. 4 is just one example, but many other configurations of the stimulation elements 410 is possible. In this example, there is a six by six set of stimulation elements 410, for a total of 36 stimulation elements 410. The number of stimulation elements 410 can vary with implementation. There are six rows of stimulation elements 410 and six columns of stimulation elements 410 in the example in FIG. 4. It is not required that number of rows is equal to the number of rows. The stimulation elements 410 are spaced apart equally in the example in FIG. 4; however, equal spacing is not required. It is not required that the pattern be arranged in rows and columns. In one embodiment, the set comprises an array of stimulation elements 410. The term "array" is being used to refer to a systematic arrangement of similar objects such as stimulation elements 410.

The cross-sectional shape of each stimulation element 410 is depicted as a circular in FIG. 4, but the stimulation elements 410 may have other cross-sectional shapes.

In one embodiment, each stimulation element 410 comprises an electro-vibration transducer. An electro-vibration transducer, as defined herein, is a transducer that is able to convert electrical energy into vibration energy. The vibration may generate a pressure wave. The pressure wave may be referred to as an air pressure wave when the wave travels through air. A pressure wave may sometimes be a sound wave. For example, an electro-vibration transducer may be controlled by an electrical signal (e.g., current or voltage) to generate a pressure wave. Thus, the stimulation interface 250 comprises a set of electro-vibration transducers configured to create pressure waves that either directly or indirectly stimulate receptors in the user's skin, in one embodiment. Note that by using the pressure waves to either directly or indirectly stimulate receptors in the user's skin, it is not necessary for the user to directly touch the electro-vibration transducer.

An electro-vibration transducer could be between about 0.5 mm to 2 mm in diameter. However, electro-vibration transducers smaller than 0.5 mm or larger than 2 mm may also be used for stimulation elements 410. In one embodiment, each stimulation element 410 comprises a micro audio speaker. The term micro audio speaker is used herein to refer to the electro-vibration transducer and an enclosure for the electro-vibration transducer. As the term is defined herein, a micro audio speaker has an enclosure of having a cross sectional diameter in the x-y plane of 2 mm or less. Thus, the electro-vibration transducer in a micro audio speaker has a cross sectional diameter of 2 mm or less.

In some embodiments, the electro-vibration transducers are driven to create sound waves that are inaudible to a human ear. In one embodiment, the electro-vibration transducers are driven to create sound waves having a frequency below 20 Hz. In some embodiments, the electro-vibration transducers are driven to create sound waves in a frequency range between 10 Hz to 10 kHz. However, the electro-vibration transducers could be driven to create sound waves below 10 Hz or greater than 10 kHz.

In one embodiment, the electro-vibration transducers are driven to create sound waves having a sound pressure level at one meter from the stimulation interface 250 of less than 40 dB. However, the electro-vibration transducers could be driven to create sound waves having a sound pressure level at one meter from the stimulation interface 250 of greater than 40 dB, in some embodiments. In one embodiment, the electro-vibration transducers are driven to create sound waves having an amplitude between 0 dB to 40 dB at a distance of one meter from the stimulation interface 250.

The format of the information provided by the UE 110 to the haptic stimulation device 240 may vary depending on the implementation. For example, the information may be "raw data," such as text data or even image data. In this case, the haptic stimulation device 240 is configured to determine how to map the "raw data" to the pattern of haptic stimulation elements 410. However, the UE 110 may be provided the information in a more refined format. For example, the UE 110 may have knowledge of the configuration of the pattern of stimulation elements 410. In this case, the UE 110 may instruct the haptic stimulation device 240 what should be presented in each of the stimulation elements 410.

Figure 5:
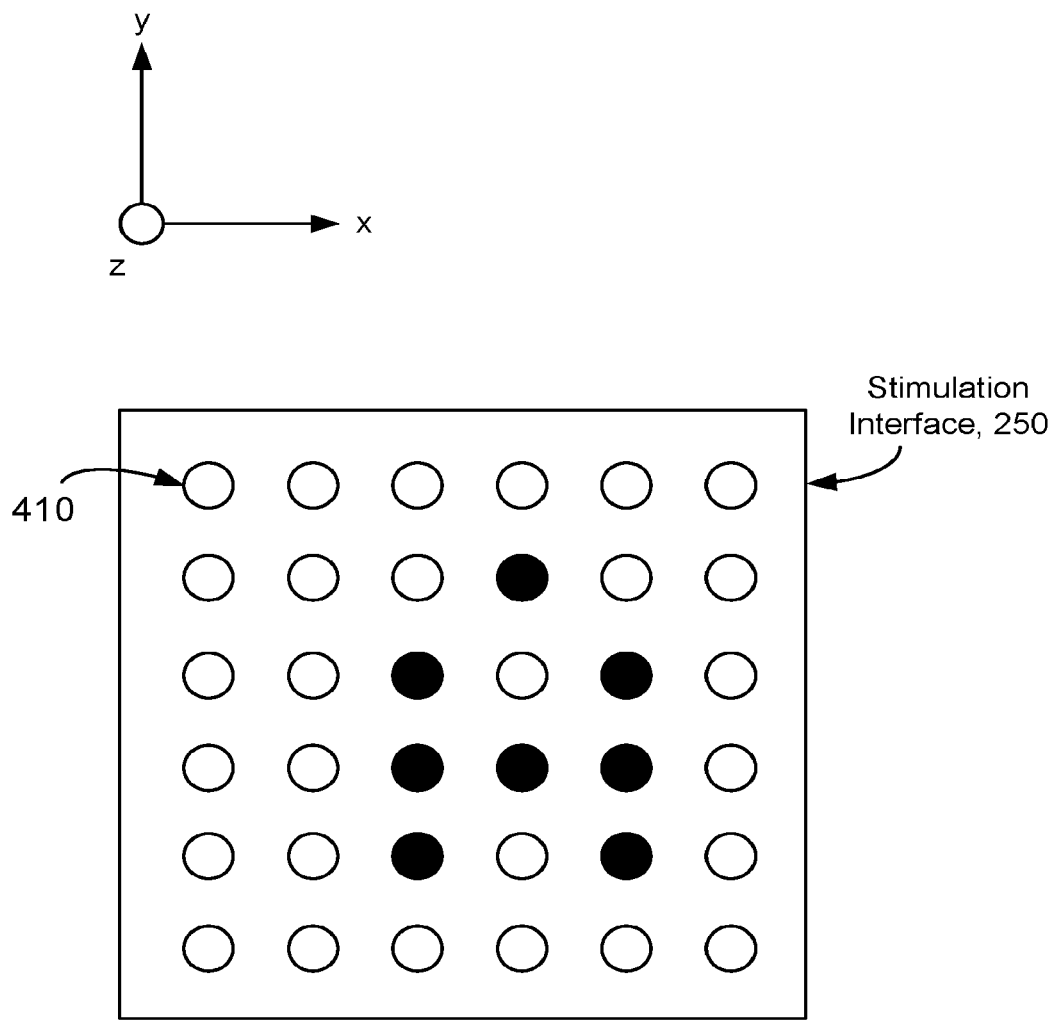
FIG. 5 depicts an embodiment of presenting information in a haptic stimulation interface in a presentation mode referred to herein as "symbolic representations of letters."

FIG. 5 depicts an embodiment of presenting information in a haptic stimulation interface 250 in a presentation mode referred to herein as "symbolic representations of letters." The letter "A" from the English alphabet is being represented on the haptic stimulation interface 250. In this example, the representation in the haptic stimulation interface 250 has a visual appearance of the letter "A" from the English alphabet. This concept may be applied to alphabets of other languages.

Figure 6:
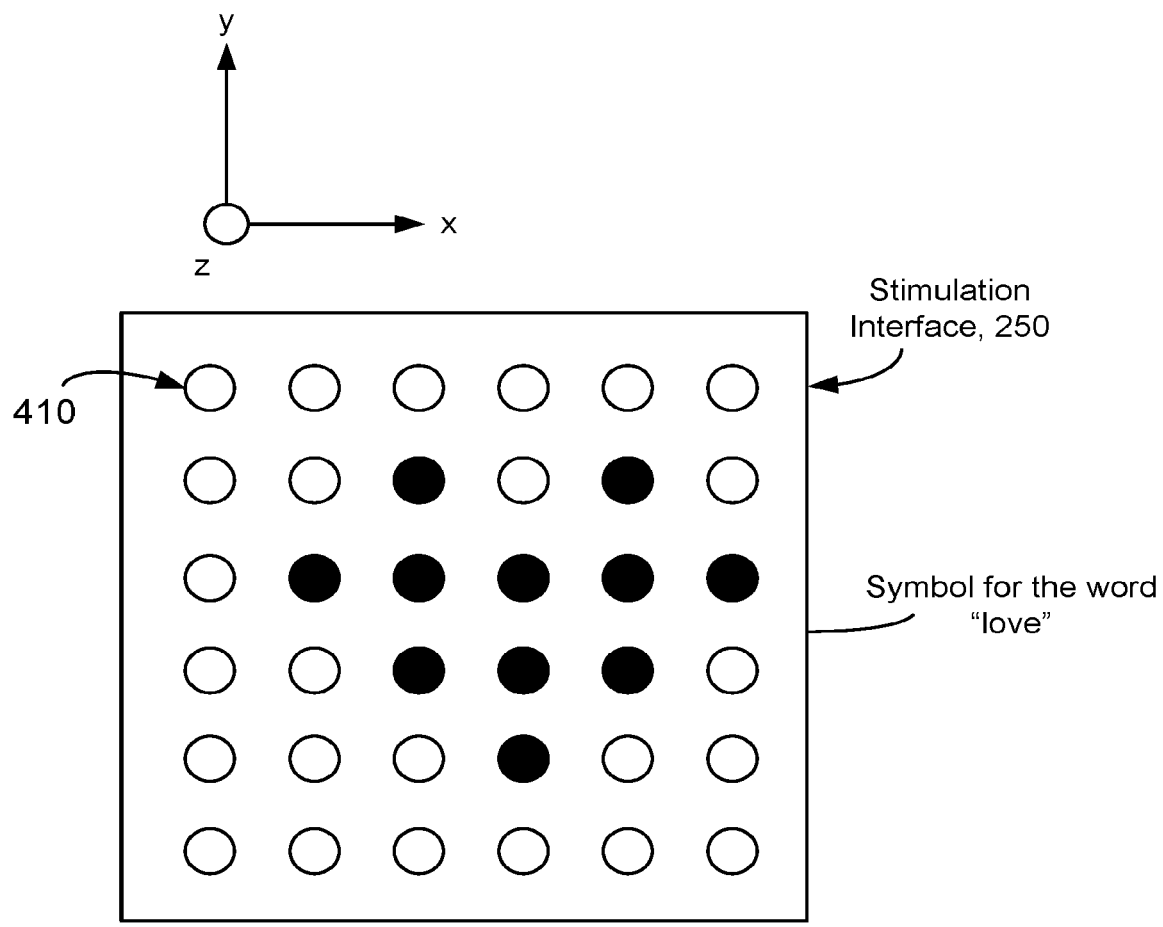
FIG. 6 depicts an embodiment of presenting information in a haptic stimulation interface in a presentation mode referred to herein as "symbolic representations of words."

FIG. 6 depicts an embodiment of presenting information in a haptic stimulation interface 250 in a presentation mode referred to herein as "symbolic representations of words." The word "love" from the English alphabet is being represented on the haptic stimulation interface 250. In this example, the representation in the haptic stimulation interface 250 has a visual appearance of the symbol of a heart, which in this example is a symbolic representation of the word "love." Note that being able to present an entire word, as opposed to a single letter, in the haptic stimulation interface 250 allows haptic stimulation interface 250 to be more efficient at presenting information to the user. For example, it can take far less time to present an email to the user. However, in some cases, the user is unable to interpret the more complex words. In other words, the user may be better able to interpret letters of an alphabet.

The concepts of FIGS. 5 and 6 may be applied to characters or symbols for writing in other languages. Thus, one embodiment comprises a presentation mode referred to herein as a "symbolic representation of characters for writing in a language." For example, in one embodiment, the presentation mode is symbolic representations of Chinese characters. Here, Chinese characters refers to any of the known characters that have been developed to write a Chinese language.

Figure 7A:
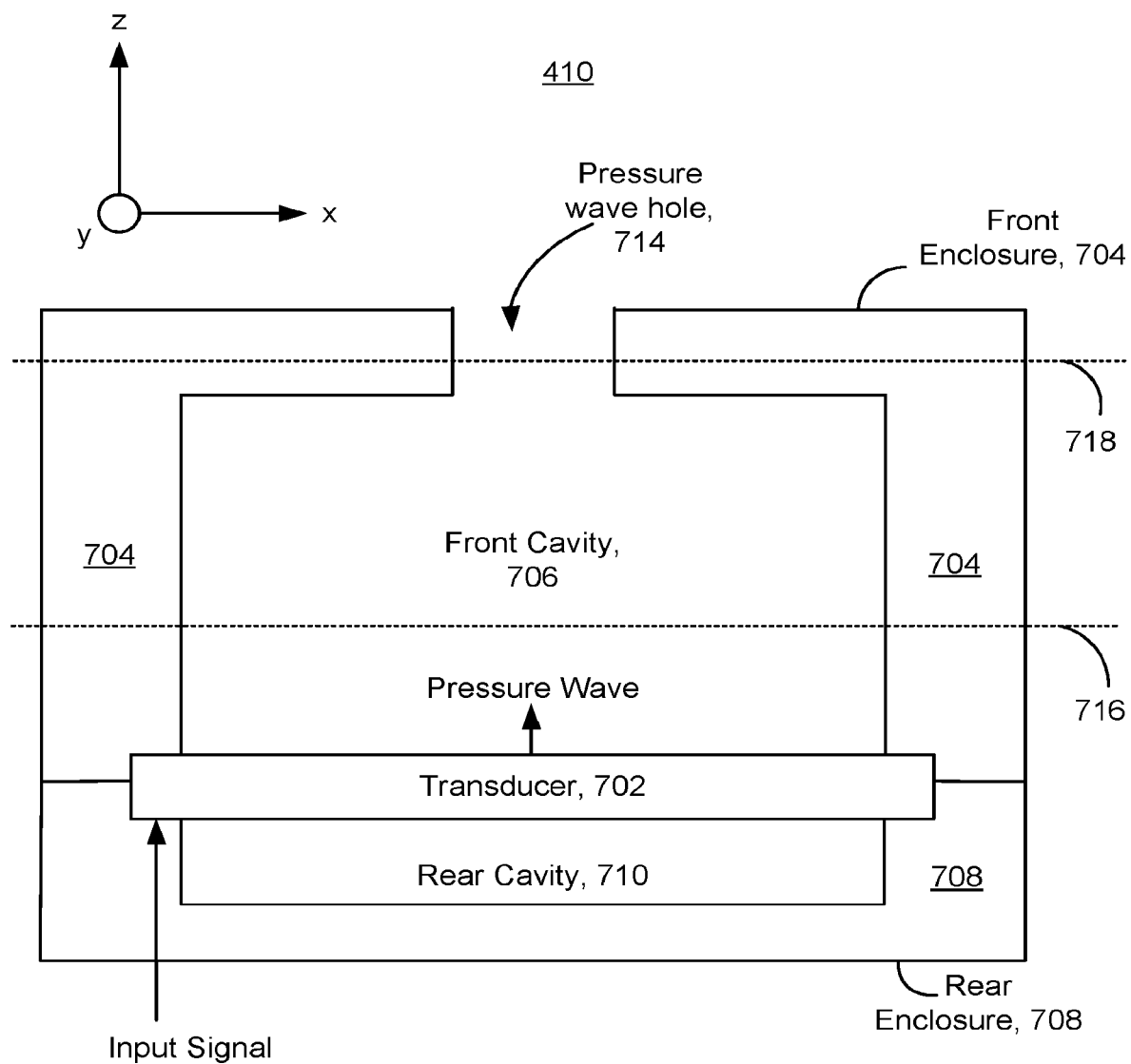
FIG. 7A is a diagram of one embodiment of a haptic stimulation element.
Figure 7B:
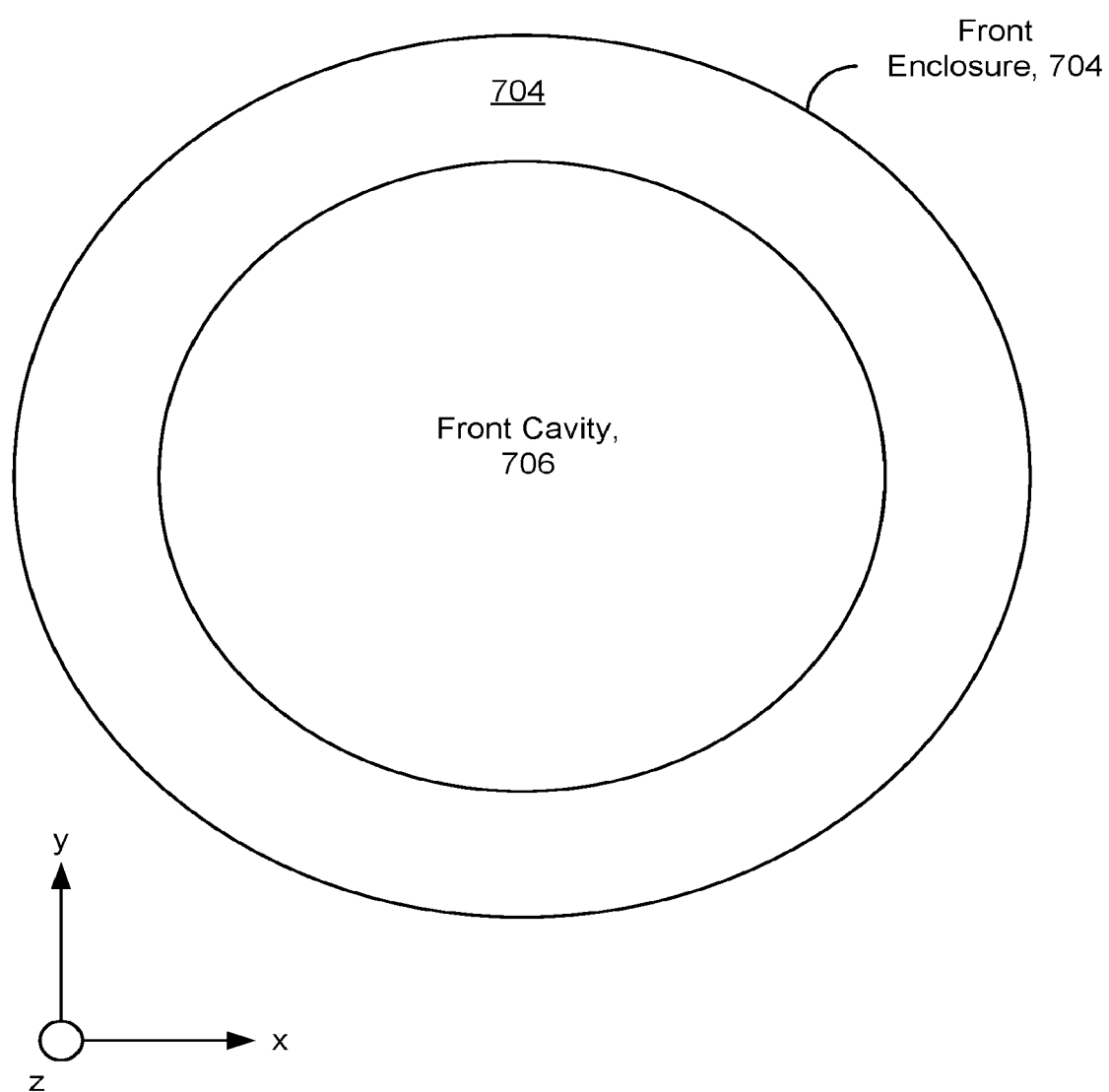
FIG. 7B depicts a cross sectional view of the front enclosure along line 716 in FIG. 7A.

FIG. 7A is a diagram of one embodiment of a haptic stimulation element 410. The haptic stimulation element 410 may be one of a set of haptic stimulation elements 410 in a stimulation interface 250 in a haptic stimulation device 240. The haptic stimulation element 410 includes a transducer 702. The transducer 702 is encased within a front enclosure 704 and a rear enclosure 708. The front enclosure 704 is coupled to the transducer 702 to form a front cavity 706 that is bounded by the front enclosure 704 and the transducer 702. FIG. 7B depicts a cross sectional view of the front enclosure 704 along line 716 in FIG. 7A. The front cavity 706 is empty (other than air), in one embodiment. Therefore, the pressure wave is free to travel in the air of the front cavity 706. Referring again to FIG. 7A, the rear enclosure 708 is coupled to the transducer 702 to form a rear cavity 710 that is bounded by the rear enclosure 708 and the transducer 702. The rear cavity 710 is filled with a material that dampens pressure waves (e.g., sound waves), in some embodiments.

The transducer 702 generates a pressure wave in the front cavity 706 when stimulated by the input signal. The input signal is an electrical signal, in some embodiments. The pressure wave is generated due to vibration of the transducer 702. For example, the transducer 702 may be an electro-vibration transducer that is able to convert electrical energy supplied by the input signal into vibration energy, which may in turn generate a pressure wave. The transducer 702 vibrates about an equilibrium point, in some embodiments. The direction of the vibration is in the general direction of the z-axis, in some embodiments. In some embodiments, the maximum displacement of the transducer 702 during vibration is controlled in order to control the pressure level of the pressure wave in the front cavity 706. In some embodiments, the transducer 702 vibrates between a maximum displacement point in the +z direction (into the front cavity 706) and a maximum displacement point in the −z direction (into the rear cavity 710). As noted above, the rear cavity 710 may be filled with a material that dampens pressure waves (e.g., sound). In other words, the rear cavity 710 may be filled with a material that dampens pressure waves in the rear cavity 710.

Figure 7C:
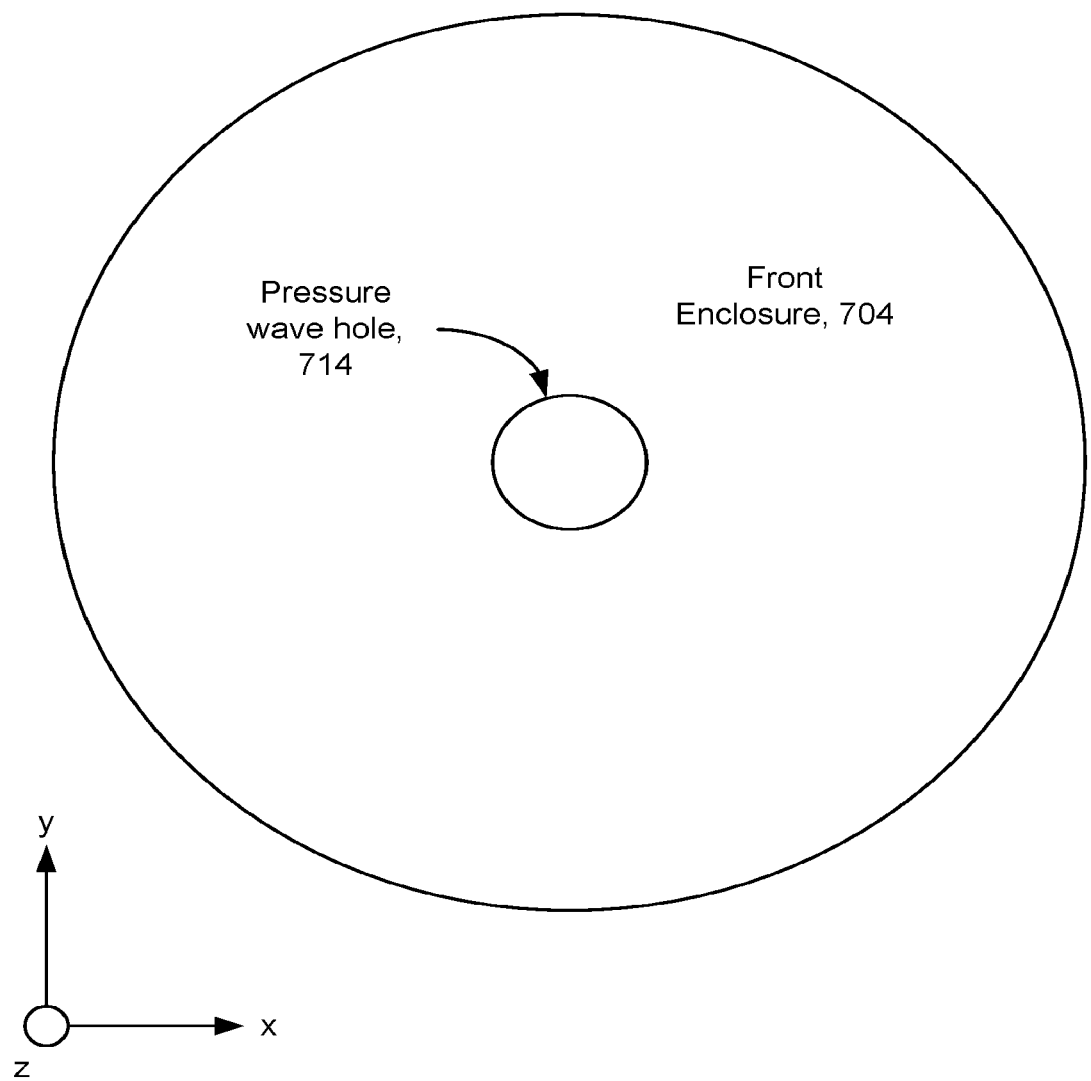
FIG. 7C depicts a cross sectional view of the front enclosure along line 718 in FIG. 7A.

The front enclosure 704 has a pressure wave hole 714, in some embodiments. The pressure wave hole 714 allows a path for the pressure wave (e.g., the sound pressure wave) to emanate from the front cavity 706, in some embodiments. FIG. 7C depicts a cross sectional view of the front enclosure 704 along line 718 in FIG. 7A. The pressure wave hole 714 has a circular shape in the embodiment of FIG. 7C, but other shapes may be used. For example, the pressure wave hole 714 could have a polygonal shape, such as a square, rectangle, octagon, etc. The pressure wave hole 714 serves as a haptic stimulation region, in some embodiments. For example, the pressure wave that emanates from the pressure wave hole 714 is used to stimulate receptors in the user's skin, in some embodiments. Thus, the pressure wave holes 714 from in a set of haptic stimulation elements 410 may be used to generate a haptic stimulation pattern in a user's skin based on pressure waves in the front cavities 706 of the haptic stimulation element 410. There may be more than one pressure wave hole 714 in the front enclosure 704. When more than one pressure wave hole 714 is present in the front enclosure 704, the different pressure wave holes may have different sizes and/or shapes. The front enclosure 704 does not have a pressure wave hole 714, in other embodiments.

In some embodiments, the front enclosure 704 comprises a cavity resonator. The cavity resonator is an enclosed (or largely enclosed) structure that confines the pressure waves from the transducer 702. The cavity resonator may also be referred to as an acoustic cavity resonator, in some embodiments. A cavity resonator exhibits resonance behavior. For example, the front enclosure 704 has one or more resonant frequencies, in some embodiments. In other words, the front enclosure 704 may naturally oscillate at its one or more resonant frequencies. An acoustic cavity resonator may be used to enhance the acoustic energy at one or more resonant frequencies. For example, an acoustic cavity resonator may be configured to enhance the acoustic energy at lower frequencies in order to emphasize frequencies that are below a threshold of human hearing (e.g., inaudible). Alternatively, an acoustic cavity resonator may be used to diminish the acoustic energy at one or more resonant frequencies. For example, an acoustic cavity resonator may be configured to diminish the acoustic energy at resonant frequencies between 20 Hz to 20,000 Hz in order to de-emphasize frequencies that are above a threshold of human hearing (e.g., audible).

Figure 8A:
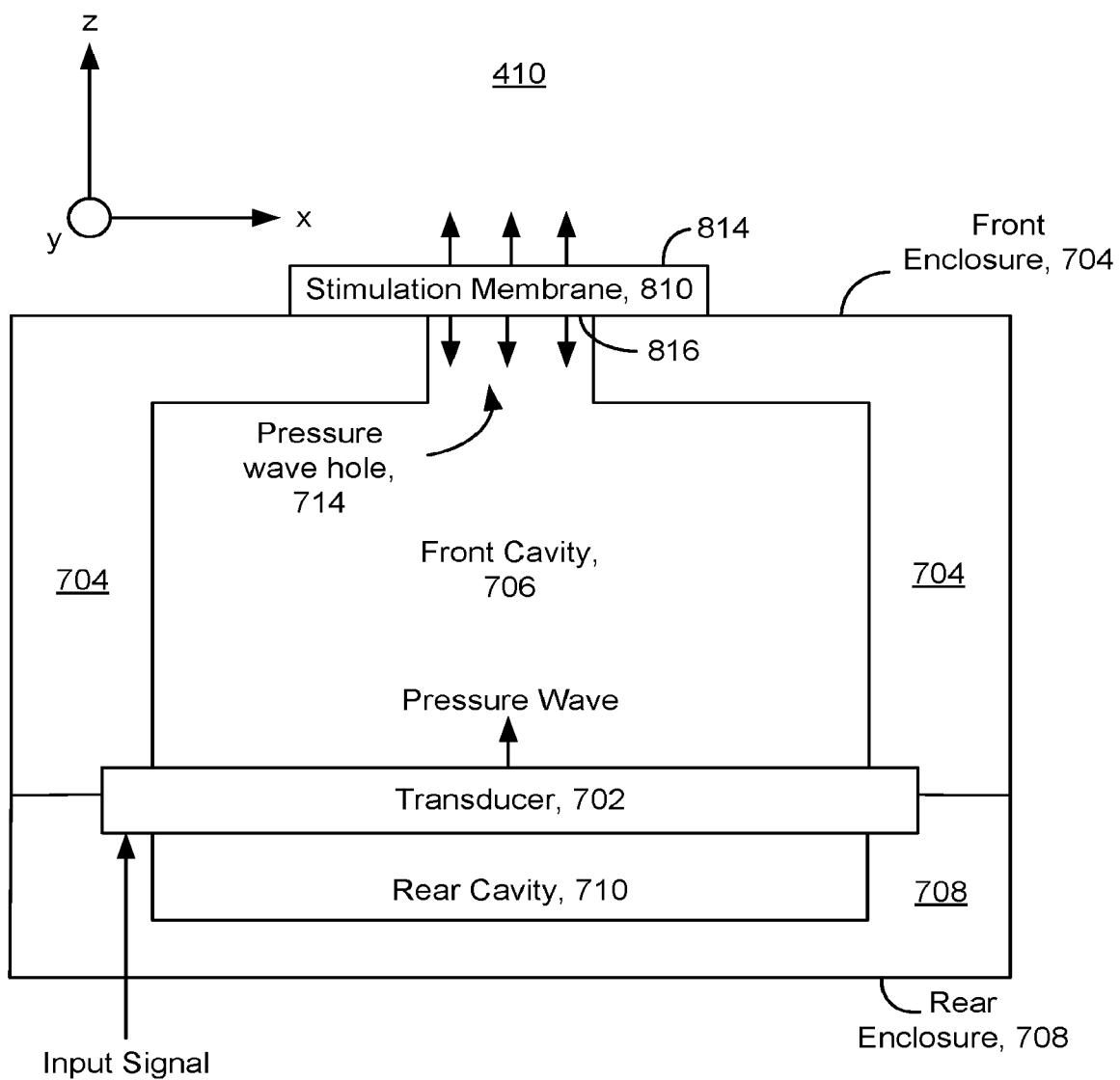
FIG. 8A depicts another embodiment of a haptic stimulation element having a stimulation membrane.
Figure 8B:
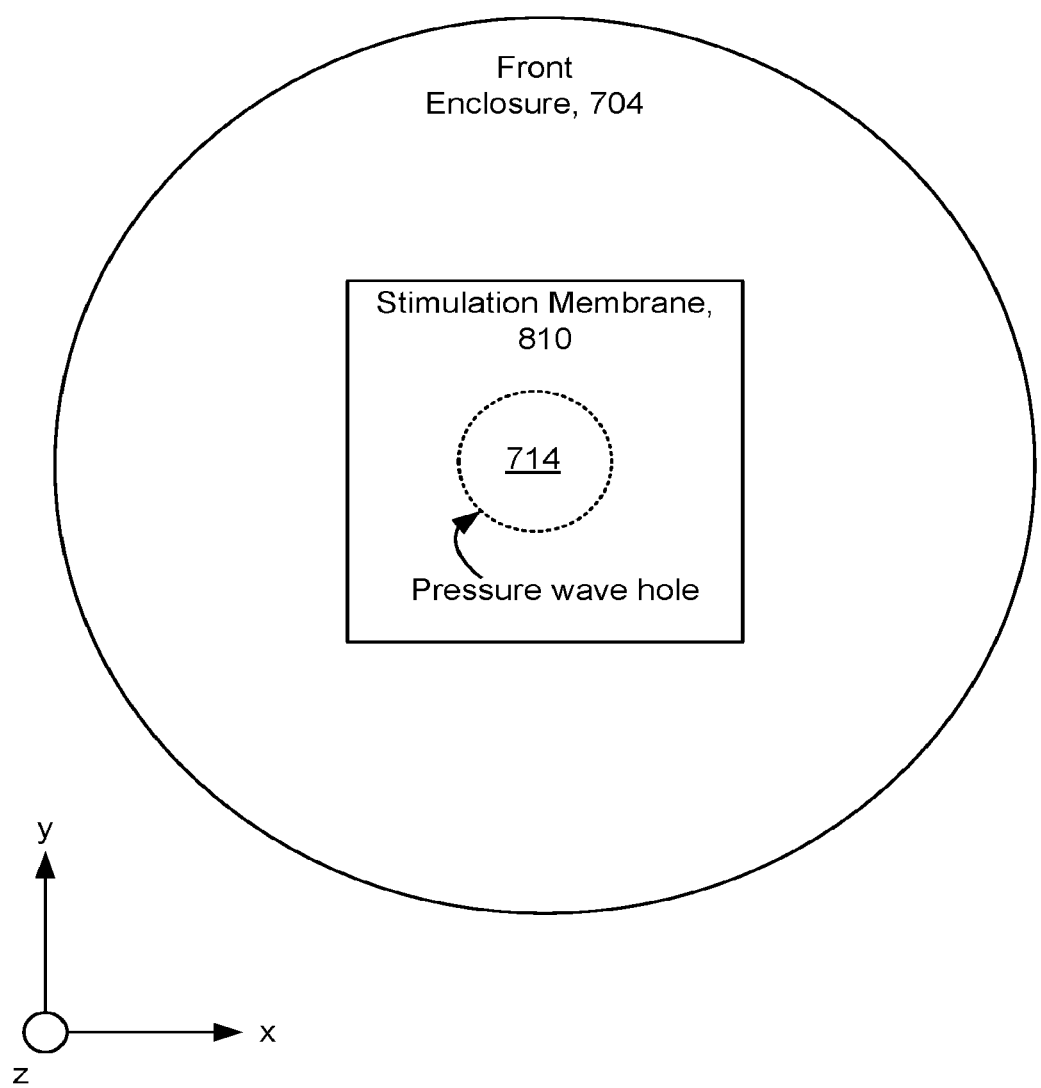
FIG. 8B depicts a top view haptic stimulation element, showing the stimulation membrane over top of the pressure wave hole.

FIG. 8A depicts another embodiment of a haptic stimulation element 410. The haptic stimulation element 410 may be one of a set of haptic stimulation elements 410 in a stimulation membrane 810 in a haptic stimulation device 240. The haptic stimulation element 410 is similar to the one of FIG. 7A, but adds a stimulation membrane 810 over the pressure wave hole 714. FIG. 8B depicts a top view haptic stimulation element 410, showing the stimulation membrane 810 over top of the pressure wave hole 714. The outline of the pressure wave hole 714 is a dashed line to indicate that the pressure wave hole 714 is below the stimulation membrane 810 in the z-direction.

Referring again to FIG. 8A, the stimulation membrane 810 will vibrate in response to the pressure wave that emanates from the front cavity 706 and into the pressure wave hole 714. Three arrows are depicted on the top surface 814 and the bottom surface 816 of the stimulation membrane 810 to indicate that the stimulation membrane 810 is configured to vibrate in response to the pressure wave. The stimulation membrane 810 may be formed from a relatively flexible material such that the energy from the pressure wave will result in relatively large movement of the stimulation membrane 810 along the z-axis. In some embodiments, the front enclosure 704 is formed from a material that much more rigid than the stimulation membrane 810, such that the energy from the pressure wave does not create nearly as much physical movement in the front enclosure. Thus, the stimulation membranes 810 from a set of haptic stimulation elements 410 may be used to generate a haptic stimulation pattern on a user's skin based on pressure waves in the front cavities 706 of the haptic stimulation element 410.

Figure 9:
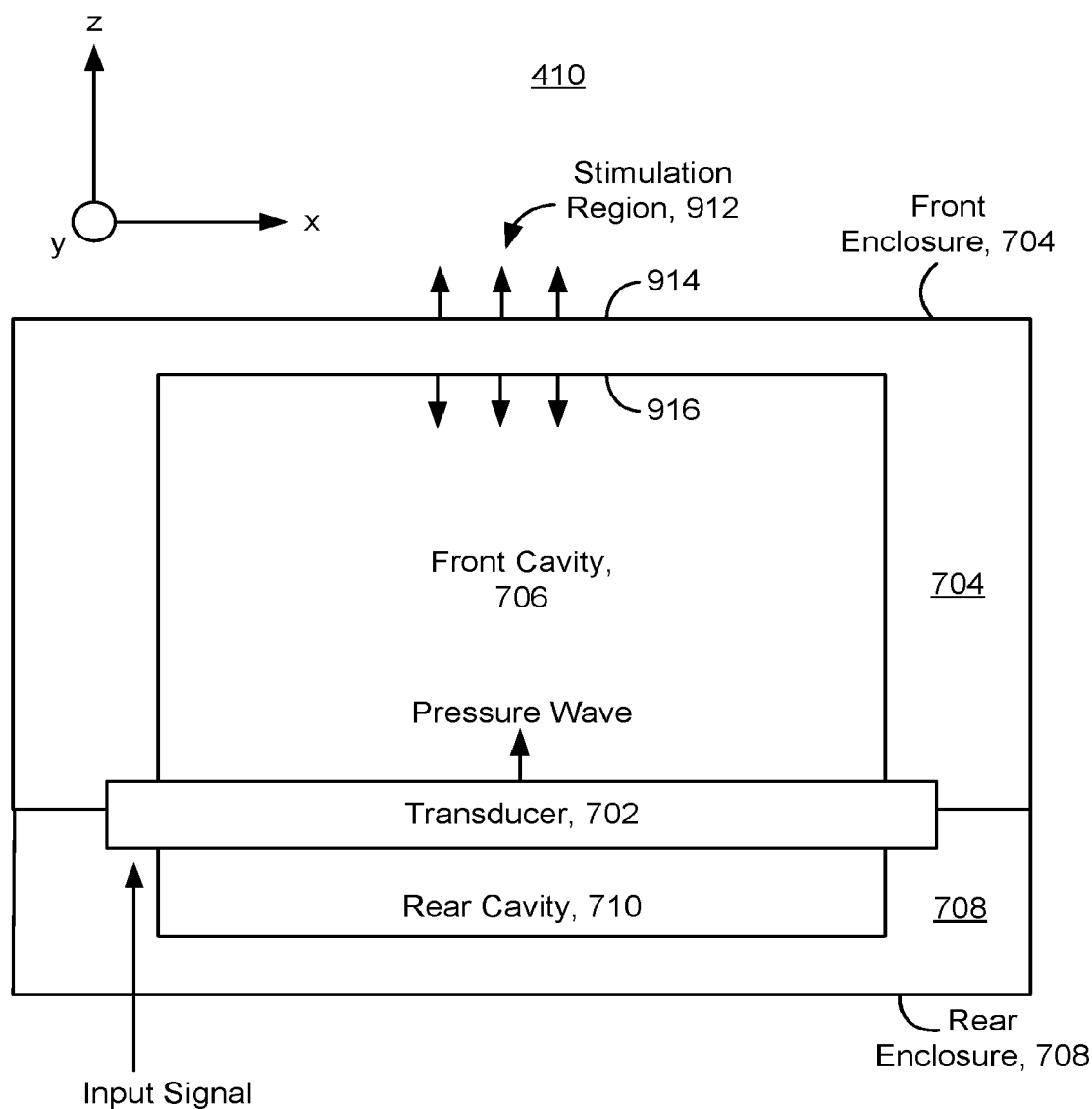
FIG. 9 depicts another embodiment of a haptic stimulation element.

FIG. 9 depicts another embodiment of a haptic stimulation element 410. The haptic stimulation element 410 may be one of a set of haptic stimulation elements 410 in a stimulation membrane 810 in a haptic stimulation device 240. The haptic stimulation element 410 is similar to the one of FIG. 7A, does not have a pressure wave hole 714. A portion of the front enclosure 704 is labeled as a stimulation region 912. Three arrows are depicted on top surface 914 and bottom surface 916 of the front enclosure 704 in the stimulation region 912 to indicate that the stimulation region 912 will vibrate in response to the pressure wave in the front cavity 706. The stimulation region 912 may be formed from a relatively flexible material such that the energy from the pressure wave will result in relatively large movement of the stimulation region 912 along the z-axis. Thus, the stimulation regions 912 from a set of haptic stimulation elements 410 may be used to generate a haptic stimulation pattern. The haptic stimulation pattern may be used to stimulate receptors in a user's skin.

Figure 10:
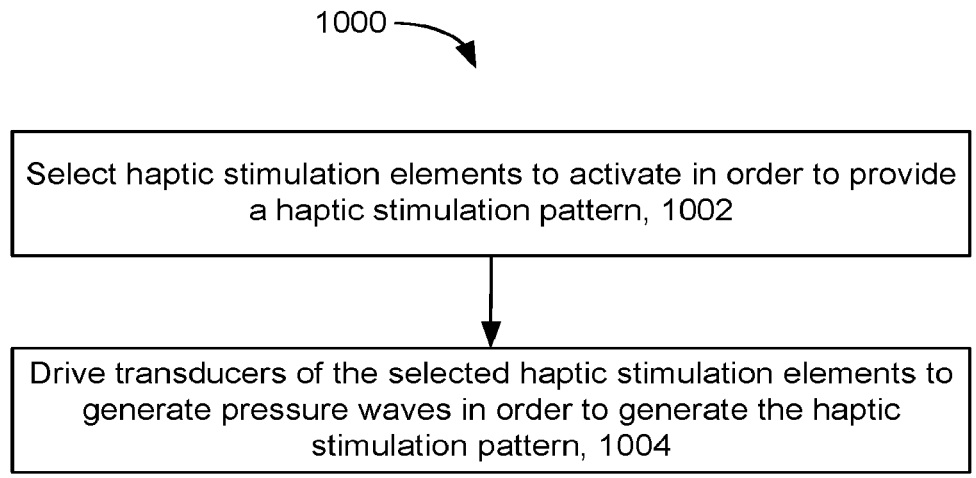
FIG. 10 is a flowchart of one embodiment of a process of providing a haptic stimulation interface.

FIG. 10 is a flowchart of one embodiment of a process 1000 of providing a haptic stimulation pattern. The haptic stimulation pattern may be used to stimulate receptors in human skin. The process 1000 is used in a haptic stimulation device 240, in one embodiment. Each of the haptic stimulation elements 410 has a transducer 702 configured to generate a pressure wave. In one embodiment, the haptic stimulation elements 410 have the configuration of FIGS. 7A-7C. In one embodiment, the haptic stimulation elements 410 have the configuration of FIGS. 8A-8B. In one embodiment, the haptic stimulation elements 410 have the configuration of FIG. 9. Process 1000 is not limited to the embodiments in FIGS. 7A-9.

Step 1002 includes selecting which haptic stimulation elements 410 to activate in order to provide the haptic stimulation pattern. Each of the haptic stimulation elements 410 has a front enclosure 704 coupled to the transducer 702 thereby forming a front cavity 706 bounded by the front enclosure 704 and the transducer 702, in one embodiment. It is not required that the transducer 702 in each of the haptic stimulation elements 410 be selected at the same time. For example, certain elements 410 can be selected to represent a letter in an alphabet, as in FIG. 5. As another example, certain elements 410 can be selected to represent a symbol (other than a letter in an alphabet), as in FIG. 6.

Step 1004 includes driving the transducers 702 of the selected haptic stimulation elements 410 to generate pressure waves in order to generate the haptic stimulation pattern based on the pressure waves. By a user contacting the haptic stimulation pattern, receptors in the user's skin may be stimulated. In one embodiment, step 1004 includes driving the transducers 702 to generate inaudible acoustic waves. For example, the sound wave at a distance of one meter from the haptic stimulation interface 250 has an SPL of less than 40 dB such that it is inaudible. As another example, the sound wave that emanates from the haptic stimulation interface 250 has a frequency of less than 20 Hz such that it is inaudible. As another example, the sound wave that emanates from the haptic stimulation interface 250 has a frequency of greater than 20 kHz such that it is inaudible.

Step 1004 includes generating the haptic stimulation pattern based on the pressure waves in the front cavities 706, in one embodiment. In one embodiment, step 1004 includes generating the haptic stimulation pattern based on pressure waves that emanate from pressure wave holes 714 of the front enclosures 704 of the haptic stimulation elements 410. In this case, the pressure waves may be used to directly stimulate the receptors in the user's skin. In one embodiment, step 1004 includes vibrating stimulation membranes 810 positioned over pressure wave holes 714 of the front enclosures 704 of the haptic stimulation elements 410. In this case, the stimulation elements 410 may be used to directly stimulate the receptors in the user's skin. In one embodiment, step 1004 includes vibrating stimulation regions 912 of the front enclosures 704 of the haptic stimulation elements 410. In this case, the vibrating stimulation regions 912 may be used to directly stimulate the receptors in the user's skin.

Figure 11:
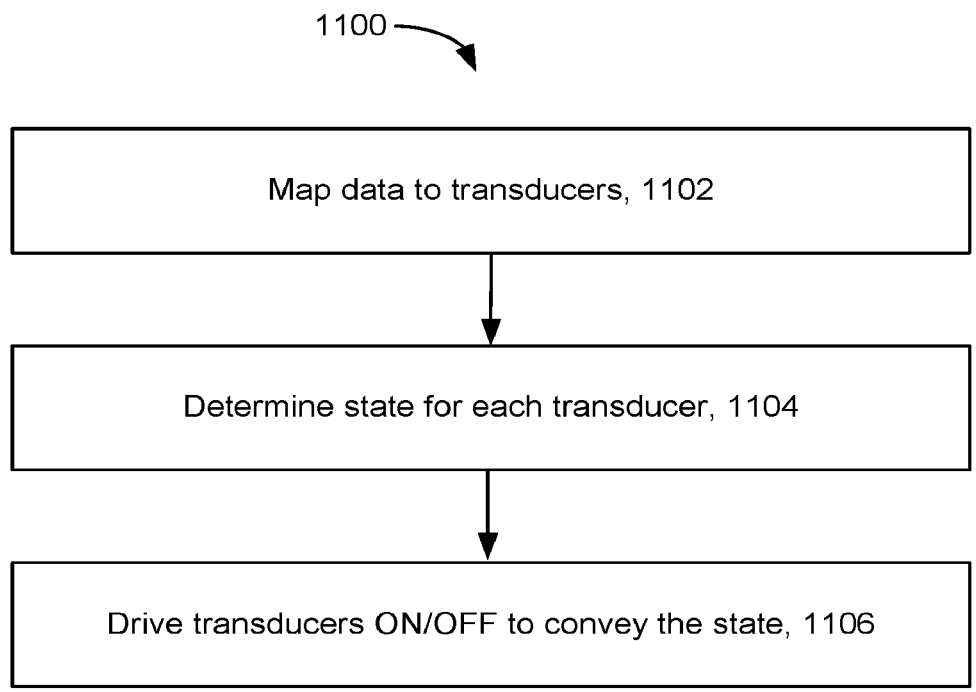
FIG. 11 is a flowchart of one embodiment of a process of driving transducers in order to convey information in a stimulation pattern.

FIG. 11 is a flowchart of one embodiment of a process 1100 of driving transducers 702 in order to convey information in a haptic stimulation pattern. Step 1102 includes mapping data (e.g., the information to be conveyed) to the transducers 702 in the haptic stimulation interface 250. For example, the mapping can be used to represent a letter in an alphabet, as in FIG. 5. As another example, the mapping can be used to represent a symbol (other than a letter in an alphabet), as in FIG. 6.

Step 1104 includes determining a state for each transducer 702. In process 1100, a transducer 702 is controlled in one of two states, which are referred to as "on" or "off" With reference to the examples of FIGS. 5-6, the elements 410 in black correspond to the "on" state and other elements 410 correspond to the "off" state.

Step 1106 includes driving the transducers 702 to either the on state or the off state to convey the information in the haptic stimulation interface 250. In one embodiment, the off state means that the transducer 702 is not vibrating. In one embodiment, the on state means that the transducer 702 is vibrating. The "on" transducers 702 are each vibrated at the same frequency, in one embodiment. The "on" transducers 702 are each vibrated at the same amplitude, in one embodiment. The amplitude being referred to here is the displacement of the transducer from its equilibrium point. The "on" transducers 702 are each vibrated at the same frequency and the same amplitude, in one embodiment.

Figure 12A:
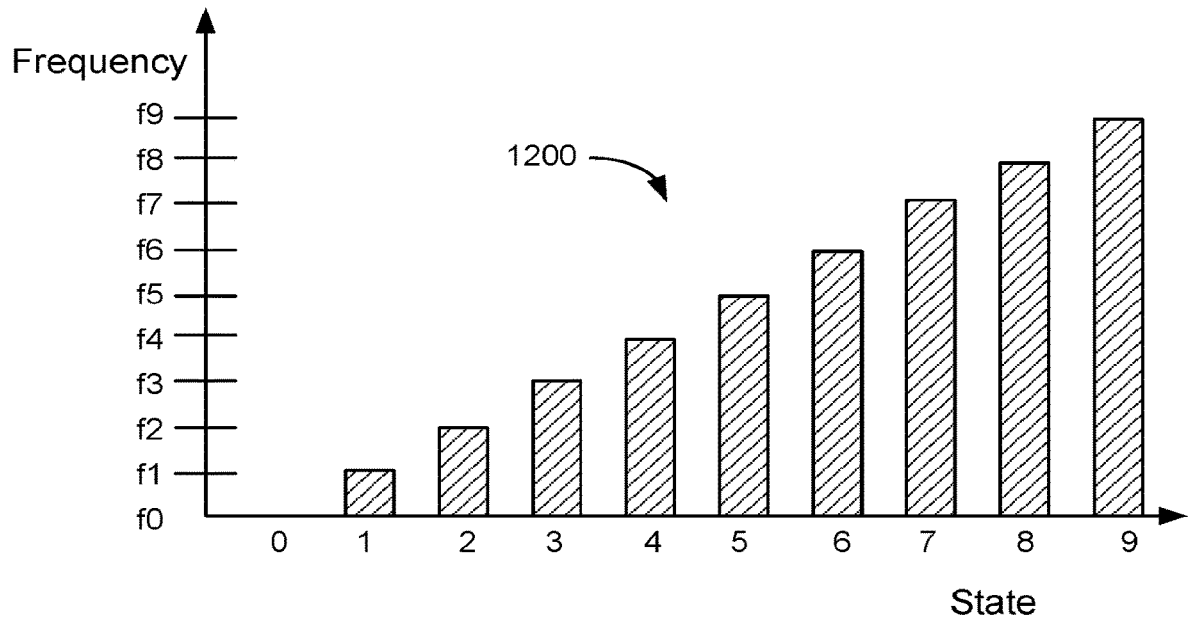
FIG. 12A is a graph to depict how different frequencies are used to represent different states, in one embodiment.

In some embodiments, the haptic stimulation elements are driven at certain frequencies to convey different states. FIG. 12A is a graph 1200 to depict how different frequencies are used to represent different states, in one embodiment. In FIG. 12A, ten different states (state 0-state 9) are represented by a corresponding ten different frequencies (f0-f9). State 0 is represented by a frequency (f0) of 0 Hz, which corresponds to the transducer 702 being in an "off state." State 0 could be represented by a non-zero (i.e., positive) frequency. State 9 corresponds to the highest frequency (f9). An example frequency range for f1 to f9 is 10 Hz to 10 kHz. One example use case is for the 10 states to correspond to the ten digits 0-9. This concept may be used to represent information other than numbers (e.g., digits). There may be more or fewer than ten states.

Figure 12B:
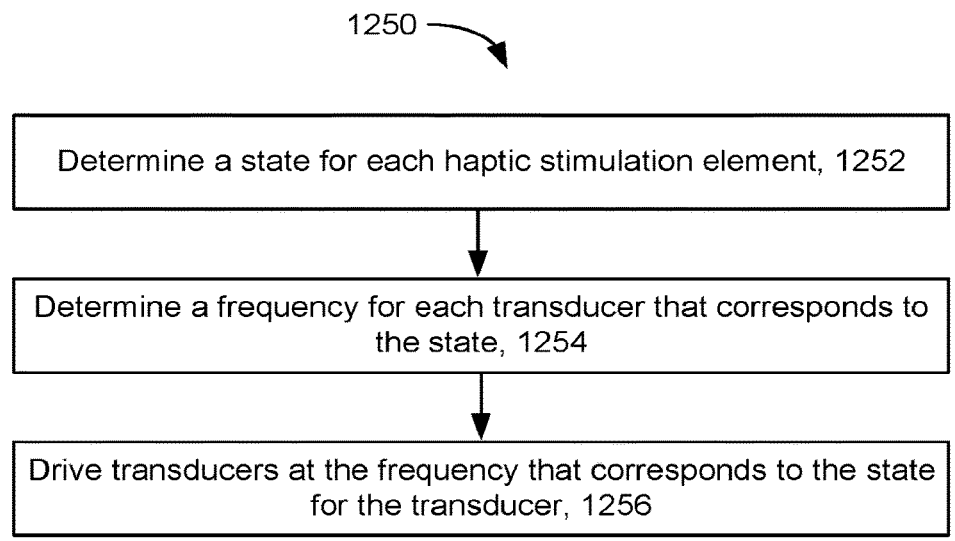
FIG. 12B is a flowchart of one embodiment of a process of driving transducers at state dependent frequencies in order to convey information in a stimulation pattern.

FIG. 12B is a flowchart of one embodiment of a process 1250 of driving transducers 702 in order to convey information in a haptic stimulation pattern. Process 1250 will be described with reference to the example of FIG. 12A, but is not limited to that example. Step 1252 includes determining a state for each haptic stimulation element 410 in the haptic stimulation interface 250. For example, the controller 270 determines which of the ten states from FIG. 12A should be assigned to each haptic stimulation element 410. It is possible that the same state is selected for each haptic stimulation element 410. It is possible that two, three, or more states are selected. With respect to the example of FIG. 12A, any combination of the ten states may be selected, in some embodiments.

Step 1254 includes determining a frequency at which to drive each transducer 702. As one example, the controller 270 selects one of frequencies f0-f9, depending on the corresponding state (state 0-state 9) for the haptic stimulation element 410.

Step 1256 includes driving the transducers 702 at the frequencies that were determined in step 1254 in order to convey state information in the haptic stimulation interface 250. Note that if there is a state that corresponds to a frequency of 0 Hz, this will be considered to be "driving the transducer" at a frequency of 0 Hz. In other words, the transducer 702 does not need to vibrate for a state that is assigned a frequency of 0 Hz. Driving the transducers 702 at non-zero frequencies will cause the transducer to vibrate at that frequency. In one embodiment of step 1256 two, three, or more frequencies are used at the same time. It is possible that only one of the frequencies (f0-f9) is used at one time, with a different frequency being used at a different time. For example, the number "4" could be signified to the user by vibrating all (or a subset) of the transducers 702 at frequency f4.

Figure 13A:
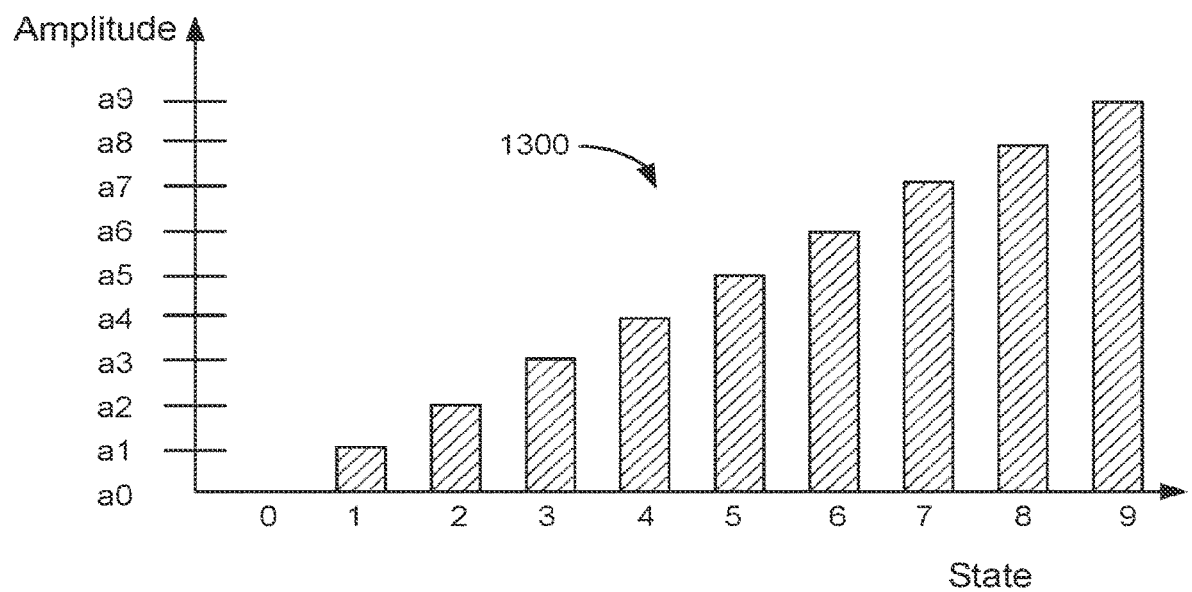
FIG. 13A is a graph to depict how different amplitudes are used to represent different states, in one embodiment.

In some embodiments, the haptic stimulation elements are driven at certain amplitudes to convey different states. FIG. 13A is a graph 1300 to depict how different amplitudes are used to represent different states, in one embodiment. In FIG. 13A, ten different states (state 0-state 9) are represented by a corresponding ten different amplitudes (a0-a9). State 0 is represented by an amplitude (a0), which corresponds to the transducer 702 being in an "off state." State 0 could be represented by a non-zero amplitude. State 9 corresponds to the highest amplitude (a9). One example use case is for the 10 states to correspond to the ten digits 0-9. The concept may be used to represent information other than numbers. There may be more or fewer than ten states.

The manner in which the amplitude is defined can vary depending on implementation. One technique is to define the amplitude as the maximum displacement of the transducer 702 in the +z direction (see FIG. 7A). Thus, the references a0-a9 represent ten different +z direction displacements, in one embodiment. Another technique is to define the amplitude based on the strength of the signal that is used to drive the transducer 702. For example, the amplitude could be defined based on the magnitude of the current that is used to drive the transducer 702. Thus, the references a0-a9 represent ten different current magnitudes, in one embodiment. As another example, the amplitude could be defined based on the magnitude of the voltage that is used to drive the transducer 702. Thus, the references a0-a9 represent ten different voltage magnitudes, in one embodiment. As another example, the amplitude could be defined based on the sound pressure level of the pressure wave that is generated by the transducer 702. Thus, the references a0-a9 represent ten different decibel levels of a sound wave at a reference distance (e.g., one meter from the haptic stimulation element 410), in one embodiment. As still another example, the amplitude could be defined based on the sound power level of the pressure wave that is generated by the haptic stimulation element 410. In contrast to a sound pressure level which decreases with distance from a sound source, the sound power level does not depend on distance from a sound source. Rather, the sound power level is defined as the power of the sound that is emitted from the haptic stimulation element 410.

Figure 13B:
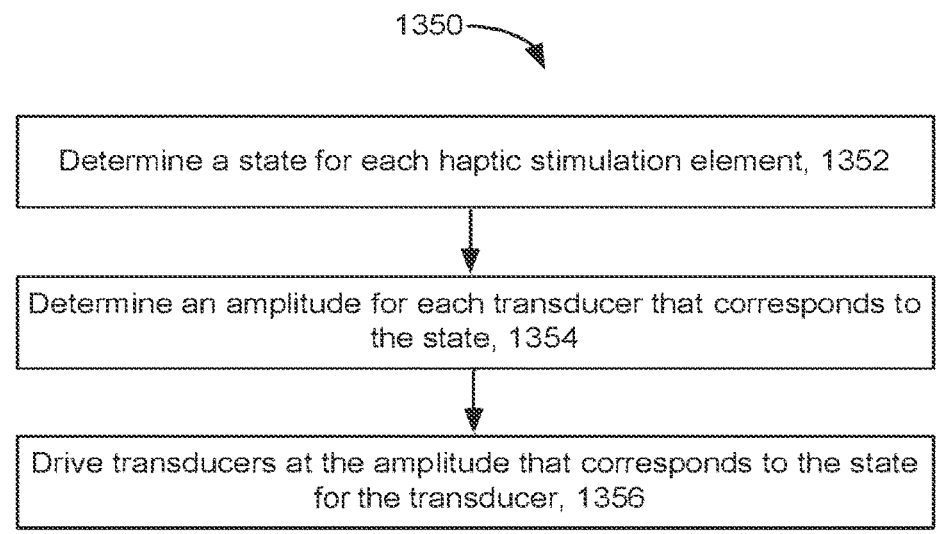
FIG. 13B is a flowchart of one embodiment of a process of driving transducers at state dependent amplitudes in order to convey information in a stimulation pattern.

FIG. 13B is a flowchart of one embodiment of a process 1350 of driving the amplitudes of transducers 702 in order to convey information in a haptic stimulation pattern. Process 1350 will be described with reference to the example of FIG. 13A, but is not limited to that example. Step 1352 includes determining a state for each haptic stimulation element 410 in the haptic stimulation interface 250. For example, the controller 270 determines which of the ten states from FIG. 13A should be assigned to each haptic stimulation element 410. It is possible that the same state is selected for each haptic stimulation element 410. It is possible that two, three, or more states are selected. With respect to the example of FIG. 13A, any combination of the ten states may be selected.

Step 1354 includes determining an amplitude at which to drive each transducer 702. As one example, the controller selects one of amplitudes a0-a9, depending on the corresponding state (state 0-state 9) for the haptic stimulation element 410. The amplitude may be based on factors including, but not limited to, maximum displacement of the transducer 702, strength of input signal (e.g., current, voltage), or the SPL of a sound wave generated by a single transducer 702.

Step 1356 includes driving the transducers 702 at the amplitudes that were determined in step 1354 in order to convey state information in the haptic stimulation interface 250. Note that if there is a state that corresponds to an amplitude of 0, this will be considered to be "driving the transducer" at an amplitude of 0. In other words, the transducer 702 does not need to vibrate for a state that is assigned an amplitude of 0. In one embodiment of step 1356 two, three, or more amplitudes are used at the same time. It is possible that only one of the amplitudes (a0-a9) is used at one time, with a different amplitude being used at a different time.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Computer readable storage media is an example of a non-transitory computer-readable medium. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware control circuit components. For example, and without limitation, illustrative types of hardware control circuit components that can be used include Field-programmable Gate Arrays (FPGAs), Application-specific Integrated Circuits (ASICs), Application-specific Standard Products (ASSPs), System-on-a-chip systems (SOCs), Complex Programmable Control Circuit Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims.

What is claimed is:

1. A haptic stimulation device comprising:
    a set of haptic stimulation elements, each haptic stimulation element comprising a transducer configured to generate a pressure wave and an enclosure coupled to the transducer thereby forming a cavity bounded by the enclosure and the transducer; and
    a controller configured to drive the transducers to generate a haptic stimulation pattern based on pressure waves in the cavities,
    wherein the enclosure of each haptic stimulation element comprises a pressure wave hole, and wherein the controller is configured to drive the transducers to cause the pressure waves in the cavities to emanate from the pressure wave holes to generate the haptic stimulation pattern.

2. The haptic stimulation device of claim 1, further comprising a stimulation membrane positioned over the pressure wave hole of each haptic stimulation element, wherein the stimulation membranes are configured to be vibrated by the pressure waves to generate the haptic stimulation pattern.

3. The haptic stimulation device of claim 1, wherein the enclosure of each haptic stimulation element comprises a stimulation region, and wherein the stimulation regions are configured to be vibrated by the pressure waves in the cavities to generate the haptic stimulation pattern.

4. The haptic stimulation device of claim 1, wherein the controller is configured to drive the transducers at different frequencies, at different amplitudes, or in one of an on state and an off state in order to convey information in the haptic stimulation pattern.

5. The haptic stimulation device of claim 1, wherein the controller is configured to drive the transducers to generate an inaudible acoustic wave having a frequency between 10 Hertz (Hz) to 10 lilo Hz (kHz).

6. The haptic stimulation device of claim 1, wherein the controller is configured to drive the transducers to generate a pressure wave having a sound pressure level of less than 40 decibel (dB) at a distance of one meter from the set of haptic stimulation elements.

7. The haptic stimulation device of claim 1, wherein the transducers comprise micro audio speakers.

8. The haptic stimulation device of claim 1, wherein the haptic stimulation elements are between 0.5 millimeter (mm) to 2 mm in cross sectional diameter.

9. The haptic stimulation device of claim 1, wherein the enclosure of each haptic stimulation element comprises a cavity resonator.

10. A method for providing a haptic stimulation interface, the method comprising:
    selecting haptic stimulation elements to activate in order to provide a haptic stimulation pattern, each haptic stimulation element comprising a transducer and an enclosure coupled to the transducer thereby forming a cavity bounded by the enclosure and the transducer; and
    driving the transducers of the selected haptic stimulation elements to generate pressure waves in the cavities in order to generate the haptic stimulation pattern based on the pressure waves that emanate from pressure wave holes of the enclosures of the haptic stimulation elements.

11. The method of claim 10, wherein driving the transducers of the selected haptic stimulation elements to generate pressure waves in the cavities in order to generate the haptic stimulation pattern based on the pressure waves comprises:
    vibrating stimulation membranes positioned over pressure wave holes of the enclosures of the haptic stimulation elements; or
    vibrating stimulation regions of the enclosures of the haptic stimulation elements.

12. The method of claim 10, further comprising:
    determining one of a plurality of states for each of the selected haptic stimulation elements; and
    determining a frequency at which to drive the transducers of the selected haptic stimulation elements, wherein a different frequency is used for each of the plurality of states, wherein the transducers are driven at the determined frequencies in order to convey the state for each of the selected haptic stimulation elements.

13. The method of claim 10, further comprising:
    determining one of a plurality of states for each of the selected haptic stimulation elements; and determining an amplitude at which to drive the transducers of the selected haptic stimulation elements, wherein a different amplitude is used for each of the plurality of states, wherein the transducers are driven at the determined amplitudes in order to convey the state for each of the selected haptic stimulation elements.

14. The method of claim 10, driving the transducers of the selected haptic stimulation elements to generate pressure waves in the cavities in order to generate the haptic stimulation pattern based on the pressure waves comprises:
driving the transducers to generate inaudible acoustic waves having a frequency between 10 Hertz (Hz) to 10 kilo (kHz).

15. The method of claim 10, wherein driving the transducers of the selected haptic stimulation elements to generate pressure waves in the cavities in order to generate the haptic stimulation pattern based on the pressure waves comprises:
driving the transducers to generate one or more pressure waves having a sound pressure level of less than 40 decibel (dB) at a distance of one meter from the selected haptic stimulation elements.

16. A haptic stimulation device, comprising:
a haptic stimulation interface comprising a pattern of haptic stimulation elements configured to stimulate receptors in skin of a user, each of the haptic stimulation elements comprising a cavity resonator and an electro-vibration transducer configured to generate a pressure wave into the cavity resonator;
a receiver configured to receive information to present in the haptic stimulation interface; and
a controller configured to drive the electro-vibration transducers based on the received information to generate a haptic stimulation pattern in the receptors in the user's skin based on the pressure waves in the cavity resonators,
wherein the cavity resonator of each haptic stimulation element comprises a pressure wave hole, and wherein the controller is configured to drive the transducers to cause the pressure waves in the cavity resonators to emanate from the pressure wave holes to generate the haptic stimulation pattern.

17. The haptic stimulation device of claim 16, wherein the controller is configured to:
determine one of a plurality of states for each of the haptic stimulation elements;
determine a frequency or an amplitude at which to drive each electro-vibration transducer, wherein a different frequency or a different amplitude is used for each of the plurality of states; and
drive the electro-vibration transducers individually at the determined frequencies in order to convey the state for each of the haptic stimulation elements.

18. The haptic stimulation device of claim 16, wherein the controller is configured to drive the electro-vibration transducers to generate an inaudible pressure wave, and wherein the cavity resonator of each haptic stimulation element comprises a pressure wave hole.

19. The haptic stimulation device of claim 18, further comprising:
a stimulation membrane positioned over the pressure wave hole of each cavity resonator.

* * * * *